US008262480B2

(12) United States Patent
Cohen et al.

(10) Patent No.: US 8,262,480 B2

(45) Date of Patent: Sep. 11, 2012

(54) TOUCH SCREEN DISPLAYS WITH PHYSICAL BUTTONS FOR GAMING DEVICES

(75) Inventors: Alexander C. Cohen, Reno, NV (US); Paulina Rodgers, Reno, NV (US); Janna B-Jensen, Reno, NV (US); Chauncey Griswold, Reno, NV (US); Leagh Beadell, Sparks, NV (US); Kirk Tedsen, Reno, NV (US); Daniel Waller, Reno, NV (US); James Stockdale, Clio, CA (US); John Goodman, Reno, NV (US); Mike Garamendi, Reno, NV (US)

(73) Assignee: IGT, Reno, NV (US)

( * ) Notice: Subject to any disclaimer, the term of this patent is extended or adjusted under 35 U.S.C. 154(b) by 180 days.

(21) Appl. No.: 12/617,545

(22) Filed: Nov. 12, 2009
(Under 37 CFR 1.47)

(65) Prior Publication Data

US 2011/0111852 A1 May 12, 2011

(51) Int. Cl.
*G06F 17/00* (2006.01)

(52) U.S. Cl. ................ 463/37; 463/16; 463/20; 463/30; 273/138.1; 273/138.2; 273/139; 200/5 D; 200/50.36; 200/422; 200/510; 345/156; 345/173; 74/473.3; 74/483 PB

(58) Field of Classification Search ................ 463/1, 29, 463/16–21, 30, 36–37, 42, 46; 273/138.1, 273/138.2, 138 A, 139, 143 R, 148 R, 237, 273/269, 301; 200/5 D, 5 E, 43.18, 50.36, 200/295–296, 276.1, 314, 341, 345, 412, 200/417, 422, 510, 520, 530; 345/156, 173–174, 345/178–180; 73/1.19, 1.23, 1.56; 40/315, 40/464; 74/473.3, 483 PB; *G06F 17/00*
See application file for complete search history.

(56) References Cited

U.S. PATENT DOCUMENTS

| | | | | |
|---|---|---|---|---|
| 5,589,856 | A | 12/1996 | Stein et al. | |
| 6,454,649 | B1 * | 9/2002 | Mattice et al. | 463/17 |
| 6,492,978 | B1 | 12/2002 | Selig et al. | |
| 6,712,698 | B2 * | 3/2004 | Paulsen et al. | 463/30 |
| 7,196,688 | B2 * | 3/2007 | Schena | 345/156 |
| 7,215,329 | B2 * | 5/2007 | Yoshikawa et al. | 345/173 |
| 7,294,059 | B2 * | 11/2007 | Silva et al. | 463/37 |
| 7,331,868 | B2 | 2/2008 | Beaulieu et al. | |
| 7,578,741 | B2 | 8/2009 | Griswold et al. | |
| 8,062,115 | B2 * | 11/2011 | Thomas et al. | 463/16 |
| 2002/0142825 | A1 * | 10/2002 | Lark et al. | 463/16 |
| 2003/0216174 | A1 * | 11/2003 | Gauselmann | 463/30 |
| 2003/0236114 | A1 | 12/2003 | Griswold et al. | |
| 2005/0054438 | A1 | 3/2005 | Rothschild et al. | |
| 2005/0059458 | A1 | 3/2005 | Griswold et al. | |

(Continued)

FOREIGN PATENT DOCUMENTS

WO WO 2007/032949 3/2007

*Primary Examiner* — Arthur O. Hall

(74) *Attorney, Agent, or Firm* — Weaver Austin Villeneuve & Sampson LLP

(57) ABSTRACT

Disclosed are methods, apparatus, and systems implementing techniques for providing input for playing a game of chance. A gaming machine includes a touch screen display. The touch screen display is configured to display input selections, auxiliary input selections, and auxiliary data. The touch screen display is further configured to receive game input corresponding to the input selections and auxiliary input corresponding to the auxiliary input selections. The received game input and auxiliary input are transmitted to a controller of the gaming machine.

7 Claims, 16 Drawing Sheets

U.S. PATENT DOCUMENTS

| | | | | |
|---|---|---|---|---|
| 2005/0113163 | A1 | 5/2005 | Mattice et al. | |
| 2005/0206625 | A1 | 9/2005 | Mattice et al. | |
| 2007/0060363 | A1 | 3/2007 | Nguyen et al. | |
| 2007/0152962 | A1* | 7/2007 | Kim et al. | 345/156 |
| 2007/0152974 | A1* | 7/2007 | Kim et al. | 345/168 |
| 2008/0113707 | A1 | 5/2008 | Nesemeier et al. | |
| 2008/0113766 | A1 | 5/2008 | Waxman et al. | |
| 2008/0139297 | A1 | 6/2008 | Beaulieu et al. | |
| 2009/0002328 | A1* | 1/2009 | Ullrich et al. | 345/173 |
| 2009/0054122 | A1* | 2/2009 | Saito | 463/6 |
| 2009/0073084 | A1 | 3/2009 | Mullen | |
| 2009/0275406 | A1* | 11/2009 | Bytnar et al. | 463/30 |
| 2010/0141410 | A1* | 6/2010 | Aono et al. | 340/407.2 |
| 2011/0128239 | A1* | 6/2011 | Polyakov et al. | 345/173 |
| 2011/0205161 | A1* | 8/2011 | Myers et al. | 345/169 |

* cited by examiner

TOUCH SCREEN DISPLAYS WITH PHYSICAL BUTTONS FOR GAMING DEVICES

TECHNICAL FIELD

The present invention relates generally to gaming devices and systems, and more specifically to gaming devices with touch screen displays and physical button panels.

BACKGROUND

Gaming in the United States is divided into Class I, Class II and Class III games. Class I gaming includes social games played for minimal prizes, or traditional ceremonial games. Class II gaming includes bingo games, pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos. Many games of chance that are played on gaming machines fall into the Class II and Class III categories of games.

As technology in the gaming industry progresses, the traditional mechanically driven reel slot machines are being replaced with electronic counterparts, that is, electronic gaming machines having video displays based on CRT, LCD, plasma, or the like. Electronic gaming machines such as video slot machines and video poker machines are becoming increasingly popular. Part of the reason for their increased popularity is the nearly endless variety of games that can be made available for play on a single gaming machine. Advancements in video and electronic gaming enable the operation of more complex games that would not otherwise be possible on mechanical-driven gaming machines or personal computers.

Various games, particularly the Class II and Class III categories of games, can be implemented as server-based games in a server-client system. In a server-based gaming arrangement, a gaming server serves multiple gaming machines as clients. For example, a casino can include a plurality of gaming machines located on the game floor, and a connected gaming server located in a back room of the casino. Generally, the games and capabilities of a gaming machine depend on the central server. Games can be downloaded from the central server to the gaming machines for execution, for instance, when initiated by casino operations management. Alternatively, the central server can execute the games and output game data to the gaming machines.

To enhance the gaming experience, there are a number of peripheral components/devices that can be connected to a gaming machine such as a slot machine or video poker machine. Examples of these devices include player tracking units, lights, ticket printers, card readers, speakers, bill acceptors/validators, ticket readers, coin acceptors, display panels, key pads, coin hoppers and button pads. These peripheral devices are built into the gaming machine or otherwise attached to the gaming machine. For instance, a top box is often constructed as a separate component on top of the gaming machine.

Typically, using a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill acceptors/validators and coin acceptors, to accept money into the gaming machine and recognize user inputs from devices, including key pads, button pads, card readers, and ticket readers, to determine the wager amount, and initiate game play.

After game play has been initiated, the gaming machine determines a game outcome, presents the game outcome to the player and may dispense an award of some type depending on the outcome of the game. A game outcome presentation may utilize many different visual and audio components such as lights, music, sounds and graphics. The visual and audio components of the game outcome presentation may be used to draw a player's attention to various game features and to heighten the player's interest in additional game play.

Maintaining a game player's interest in game play, such as on a gaming machine or during other gaming activities, is an important consideration for an operator of a gaming establishment. More and more gaming services are being provided to gaming machines to maintain player interest. These services can be offered via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

SUMMARY OF THE INVENTION

Disclosed are methods, apparatus, and systems implementing techniques for providing input for playing a game of chance.

According to one embodiment of the invention, a gaming machine includes a touch screen display. The touch screen display is configured to display input selections, auxiliary input selections, and auxiliary data. The touch screen display is further configured to receive game input corresponding to the input selections and auxiliary input corresponding to the auxiliary input selections. The received game input and auxiliary input are transmitted to a controller of the gaming machine.

According to another embodiment of the invention, a gaming machine includes a hybrid touch screen display. The hybrid touch screen display includes a physical button overlaying the touch screen display. The physical button has a depressed level in which it activates a region of the touch screen display and a raised level where it does not active a region of the touch screen display. The hybrid touch screen display is configured to display input selections, at least one input selection visible though the physical button. The hybrid touch screen is further configured to receive game input corresponding to the input selection visible though the physical button and transmit the received game input to a controller of the gaming machine. The hybrid touch screen display may also have an electroactive polymer coupled to it to control the tactile feel of the hybrid touch screen display.

According to another embodiment of the invention, a gaming machine includes a hybrid touch screen display. The hybrid touch screen display includes a physical button overlaying the touch screen display. The physical button has a depressed level in which it activates an electroactive polymer situated between the physical button and the display. The physical button also has a raised level in which it does not activate the electroactive polymer. The hybrid touch screen display is configured to display input selections, at least one input selection visible though the physical button. The hybrid touch screen is further configured to receive game input corresponding to the input selection visible though the physical button and transmit the received game input to a controller of the gaming machine. The electroactive polymer associated with the physical button may be configured to control the tactile feel of the physical button.

According to another embodiment of the invention, a gaming machine includes an auxiliary display. The auxiliary display is configured to display input selections. A button panel is adjacent to the auxiliary display. The button panel includes a physical button, the physical button corresponding to an input selection displayed on the auxiliary display. The physical button has a depressed level in which it activates an electroactive polymer. The physical button also has a raised level in which it does not activate the electroactive polymer. The button panel is further configured to receive game input corresponding to the input selection corresponding to the physical button and transmit the received game input to a controller of the gaming machine. The electroactive polymer associated with the physical button may be configured to control the tactile feel of the physical button.

According to another embodiment of the invention, a gaming machine includes a hybrid touch screen display. The hybrid touch screen display includes a material overlaying the touch screen, the material having at least one variation defining an input area. The hybrid touch screen display is configured to display input selections, at least one input selection visible on the input area. The hybrid touch screen is further configured to receive game input corresponding to the input selection visible on the input area and transmit the received game input to a controller of the gaming machine.

BRIEF DESCRIPTION OF THE DRAWINGS

The included drawings are for illustrative purposes and serve only to provide examples of possible structures and process steps for the disclosed inventive systems and methods of gaming devices with a touch screen display with physical buttons. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following examples should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

Figure 1A:
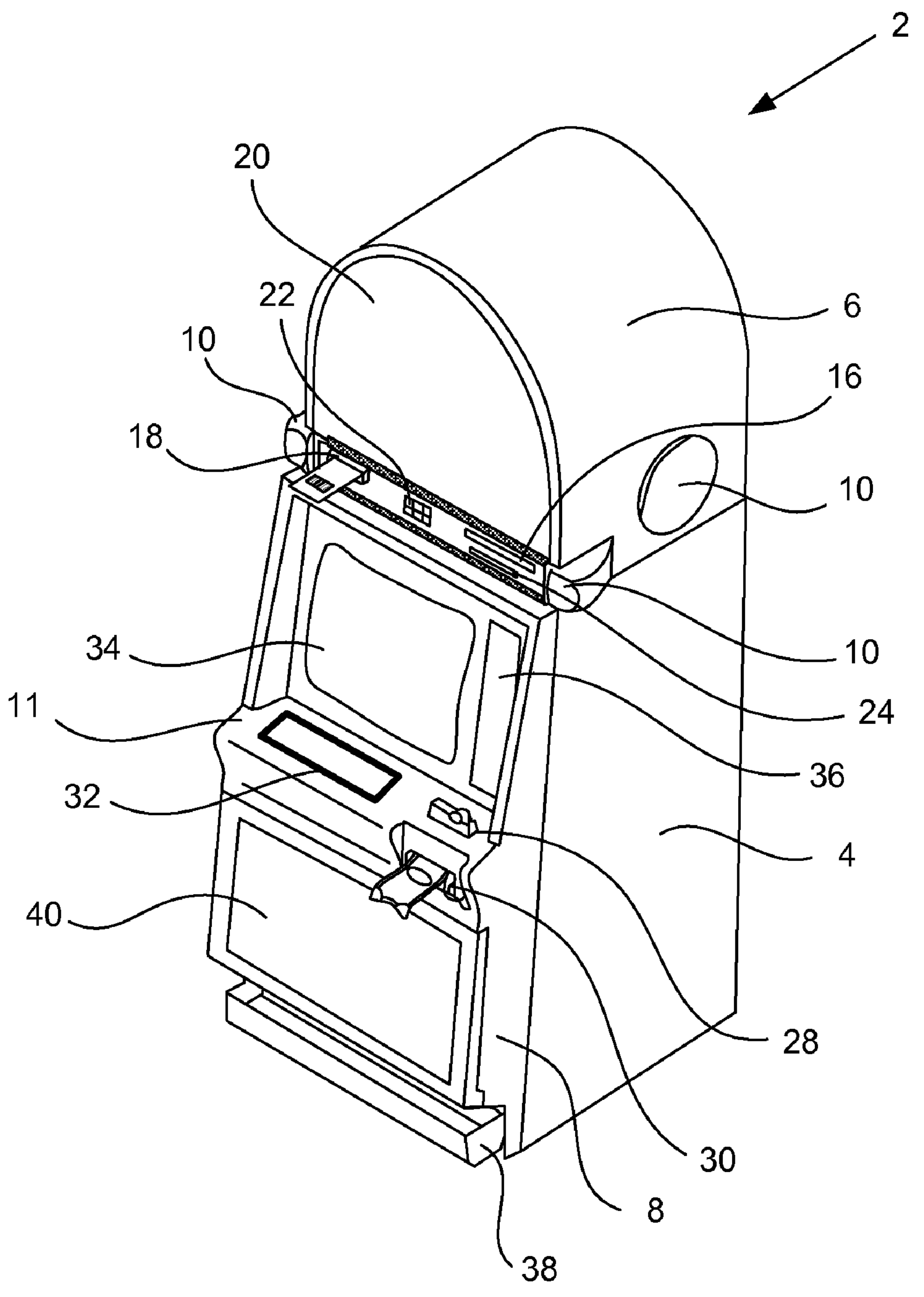
FIGS. 1A-B are views of an exemplary gaming machine.

FIG. 1A is an exemplary gaming machine 2 illustrated in perspective view. Gaming machine 2 includes a top box 6 and a main cabinet 4, which generally surrounds the machine interior (not shown) and is viewable by users, such as administrators, casino operators, and game players. This top box and/or main cabinet can together or separately form an exterior housing adapted to contain a plurality of internal gaming machine components therein. Main cabinet 4 includes a main door 8 on the front of the gaming machine, which preferably opens to provide access to the gaming machine interior. Attached to a panel 11 of the main door 8 are typically one or more player-input devices 32, one or more money or credit acceptors, such as a coin acceptor 28 and a bill or ticket validator 30, a coin tray 38, and a belly glass 40. Player-input device 32 traditionally includes a button panel with physical buttons. Player-input device 32 may include a touch screen display or a touch screen display with associated physical buttons, as described herein. Viewable through main door 8 is a main video display monitor 34 adapted to present a game, such as a game of chance or a game of skill, and one or more information panels 36. The main video display monitor 34 will typically be a cathode ray tube, high resolution flat-panel liquid crystal display (LCD), plasma/light emitting diode (LED) display or other conventional or other type of appropriate video monitor. Alternatively, a plurality of gaming reels can be used as a main gaming machine display in place of display monitor 34, with such gaming reels preferably being electronically controlled, as will be readily appreciated by one skilled in the art.

Top box 6, which typically rests atop of the main cabinet 4, may contain a ticket dispenser 18, a key pad 22, one or more additional displays 16, a card reader 24, one or more speakers 10, and a top glass 20. It will be understood that many makes, models, types and varieties of gaming machines exist, that not every such gaming machine will include all or any of the foregoing items, and that many gaming machines will include other items not described above.

Figure 1B:
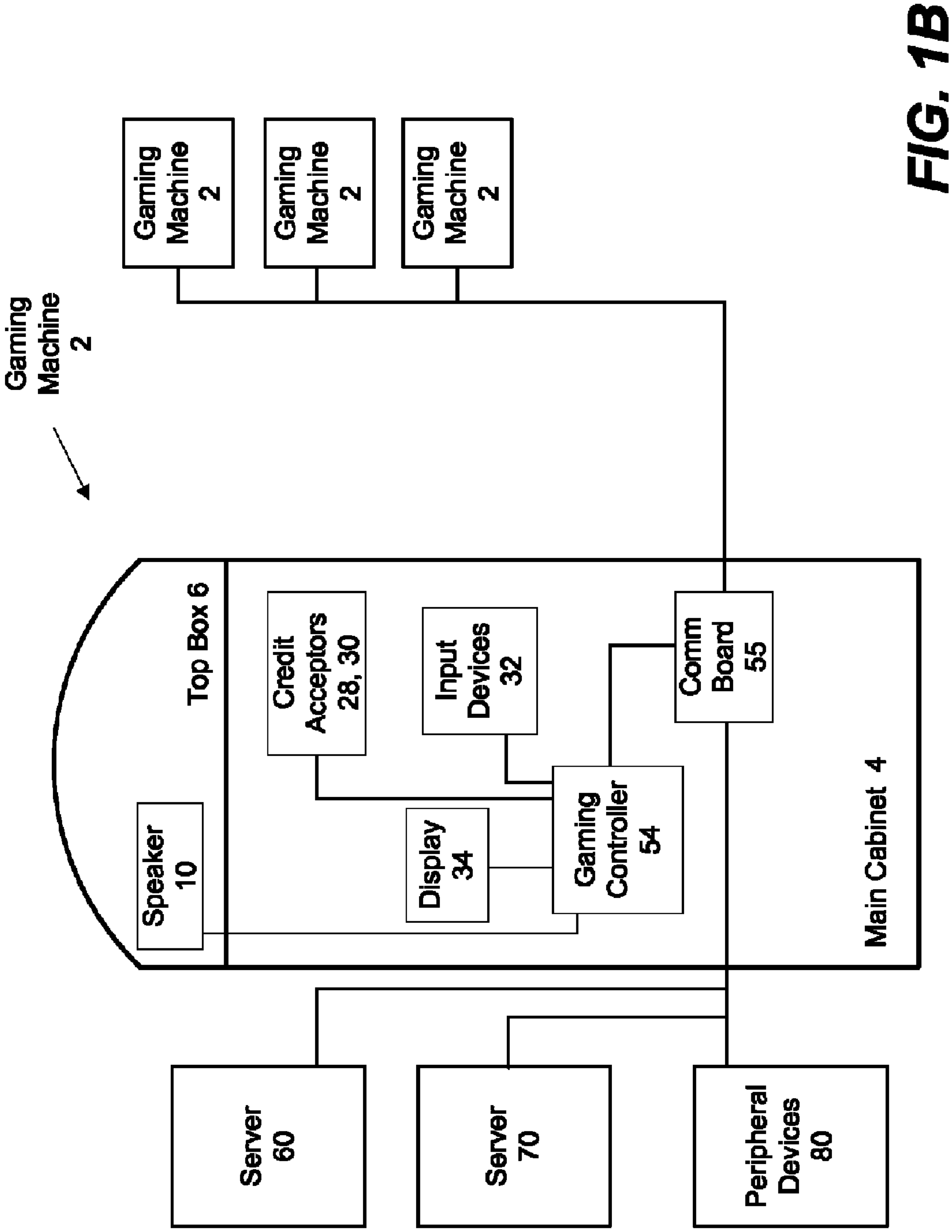

FIG. 1B is a block diagram of the interior of gaming machine 2, showing the internal gaming machine components and the connections with a number of the components shown in FIG. 1A. In gaming machine 2, gaming controller 54 controls the operation of the gaming machine. Gaming controller 54 is connected to player input devices 32, credit acceptors (28, /30), main video display monitor 34, and one or more speakers 10. Gaming controller receives input and/or provides output to these components. Gaming controller 54 may communicate with server 60, server 70, a sub-network of peripheral devices 80, and other gaming machines 2 via the communication board 55. Servers 60 and 70 and the sub-network of peripheral devices 80 are described below.

With respect to the basic gaming abilities provided, it will be readily understood that gaming machine 2 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 2, and it is specifically contemplated that the present invention can be used in conjunction with such a gaming machine or device that might encompass any or all such additional types of features and functions.

With respect to electronic gaming machines in particular, the electronic gaming machines made by IGT, Inc. are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an electrically programmable read only memory (EPROM) or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where the users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage-monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two limitations of control. The first limitation generates a software event that can be detected by the operating software and an error condition generated. This limitation is triggered when a power supply voltage falls out of the tolerance range of the power supply, but is still within the operating range of the circuitry. The second limitation is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed random access memory (RAM) devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security-monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

Figure 2:
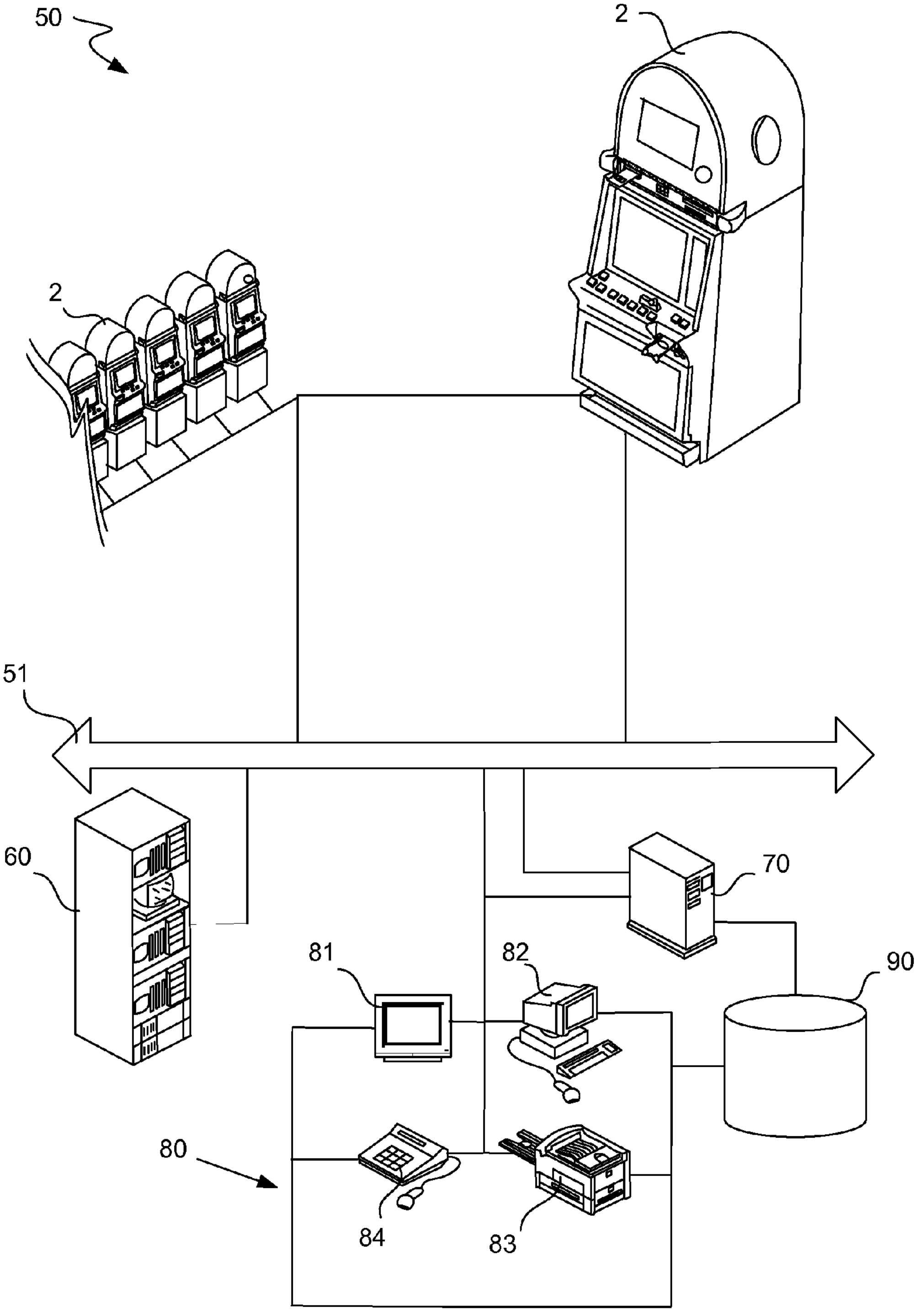
FIG. 2 is view of an exemplary network infrastructure of a gaming system having one or more gaming machines.

FIG. 2 is a view of an exemplary network infrastructure for providing a gaming system having one or more gaming machines. Exemplary gaming system 50 has one or more gaming machines, various communication items, and a number of host-side components and devices adapted for use within a gaming environment. As shown, one or more gaming machines 2 adapted for use in gaming system 50 can be in a plurality of locations, such as in banks on a casino floor or standing alone at a smaller non-gaming establishment, as desired. Common bus 51 can connect one or more gaming machines or devices to a number of networked devices on the gaming system 50, such as, for example, a general-purpose server 60, one or more special-purpose servers 70, a sub-network of peripheral devices 80, and/or a database 90.

A general-purpose server 60 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switch board communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 50 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 70 or another similar component within a general-purpose server 60 also preferably includes a connection to a database or other suitable storage medium 90. Database 90 is preferably adapted to store many or all files containing pertinent data or information for a particular purpose, such as, for example, data regarding visual image data, video clips, other displayable items, and/or related data, among other potential items. Files, data and other information on database 90 can be stored for backup purposes, and are preferably accessible at one or more system locations, such as at a general-purpose server 60, a special purpose server 70 and/or a cashier station or other sub-network location 80, as desired.

While gaming system 50 can be a system that is specially designed and created new for use in a casino or gaming establishment, it is also possible that many items in this system can be taken or adopted from an existing gaming system. For example, gaming system 50 could represent an existing cashless gaming system to which one or more of the inventive components or controller arrangements are added, such as controllers, storage media, and/or other components that may be associated with a dynamic display system adapted for use across multiple gaming machines and devices. In addition to new hardware, new functionality via new software, modules, updates or otherwise can be provided to an existing database 90, specialized server 70 and/or general-purpose server 60, as desired. Other modifications to an existing system may also be necessary, as might be readily appreciated. Such gaming systems are further described in U.S. patent Ser. No. 11/225,407, entitled METHODS AND DEVICES FOR MANAGING GAMING NETWORKS and U.S. patent application Ser. No. 11/225,408, entitled METHODS AND DEVICES FOR AUTHENTICATION AND LICENSING IN A GAMING NETWORK. These gaming systems are also referred to as server based gaming systems.

With the advent of gaming devices and machines which can change game themes, game types, and receive content via high speed networks, such as gaming machines in server based gaming systems as described herein, a need exists for more advanced player interfaces and input devices. The player interface on a gaming device or machine that is part of a server based gaming system is preferably readily changeable to accommodate the requirements of different games that may be provided by the server. For example, if the gaming machine changes from a slot machine type game to a video poker type game, the player interface would also need to change. Since the early to mid-1990's, gaming machines have used a touch screen mounted to the main display as a supplemental player input device to a traditional button panel. With such a gaming machine, a player can play a game of chance either by using the buttons on the traditional button panel or by using the touch screen on the main display (i.e., making selections on the touch screen of the main display of the gaming machine).

While attaching a touch screen to the main display of a gaming machine provides a versatile player input device that can be reconfigured based on the game or other information displayed on the main display, such a touch screen does pose at least two shortcomings. First, the ergonomics inherent to the placement of a touch screen on the main display are inferior to those of a traditional button panel. The button panel is closer to where players normally rest their hands and therefore less motion is required in order to touch an input selection (i.e., a button) on the button panel. In addition, the angle of the button panel relative to a player's wrists is less prone than that of the touch screen/main display to cause wrist pain and/or carpal tunnel syndrome.

Second, to the degree that a touch screen/main display is used in lieu of a traditional button panel, this both reduces the use of an available resource (i.e., the buttons) and more importantly, diminishes the size of the main display that can be dedicated to the game graphics. While a game graphics designer may sometimes be able to weave touch screen input selections within the game content displayed on the main display, it is undesirable to make this a requirement of game design.

A touch screen display that replaces a traditional button panel (i.e., a touch screen display, separate from the main display of the gaming machine, which is positioned where the traditional button panel would be placed) solves these shortcomings. The input selections on such a touch screen display become 'virtual' in that their function, size, and placement can be changed according to the game being played, the game there, events occurring in the game, and player preferences. Furthermore, content that would otherwise be displayed on the main display or other secondary display may be displayed on a touch screen display that replaces a traditional button panel.

"Dynamic Buttons" which embed a small LCD display within each switch body may also be used on traditional button panels to provide a user interface on a gaming machine or device. These dynamic buttons are readily changeable to accommodate the requirements of different games. With the small LCD display in each dynamic button, a button may be relabeled for a different purpose, depending on the requirements of different games. An array of ten such dynamic buttons is typically installed on a button panel. This is a complex and costly solution to providing a reconfigurable user interface, however.

A touch screen display that replaces a traditional button panel having dynamic buttons offers many advantages. First, dynamic buttons use multiple (currently, as many as ten), small form factor LCD or OLED displays which collectively have much less viewing area than a single touch screen display. Relative to the displays embedded within individual dynamic buttons, legibility, font sizing, and image contrast on a touch screen display are superior. Second, discrete buttons cannot be effectively aggregated to form a single, large display. In contrast, a touch screen display is a single, large display. This allows a touch screen display to be used as a display supplemental to the main display in the game play presentation. Third, a complete button assembly with dynamic buttons for a gaming machine consists usually of ten LCD screens, ten backlights, ten button housing assemblies (main body, plunger, spring, nut, etc.), ten mechanical switches, ten microprocessors, a flex ribbon cable, and a central controller board with its own processor. This collectively represents substantially more parts, more cost, and more points for potential failure than a touch screen display. Furthermore, a touch screen display has resistance to liquids that might be spilled on the button panel area.

A touch screen display may also complement the information displayed on the main display of a gaming machine, as described herein. For example, a gaming machine may initially present video such that a player's attention is drawn to the main display, which shows a wide field of view. Then, certain events may prompt the player to draw their focus to the touch screen display displaying gauges, a special viewing 'portal', web cam output, etc., in order to obtain additional information. Intrinsic to the game play, the player may even be offered the ability to select from an array of 'viewing portals' into different scenes and perspectives associated with the game play. These supplemental, localized views may be presented on the touch screen display while the overall or 'world view' of the game remained on the main display.

In another example, players may be presented with an array of objects to pick from, such as picking a balloon from a group of balloons, each balloon having a different award associated with it. The player could use a touch screen associated with the main display to pick a balloon, but this may become fatiguing. A more ergonomic alternative would be to display, on the touch screen display, a smaller scale replica of what is shown on the main display and allow the player to make a selection using the touch screen display. Such a setup could also be implemented with video poker, for example.

While a touch screen display offers many advantages over a touch screen/main display and a traditional button panel on a gaming machine, one shortcoming of touch screen displays is that they provide little or no tactile feedback when a player makes an input selection. For example, when a player makes an input selection on a touch screen display, the player usually taps or touches the input selection on the touch screen display. There is no movement of the touch screen and no indication that the input selection has been accepted by the gaming machine except the gaming machine performing as instructed with the input selection. In contrast, physical buttons provide tactile feedback when a player makes an input selection. Generally, a physical button moves when it is depressed and may further provide auditory feedback indicating that the physical button has been depressed.

Figure 3A:
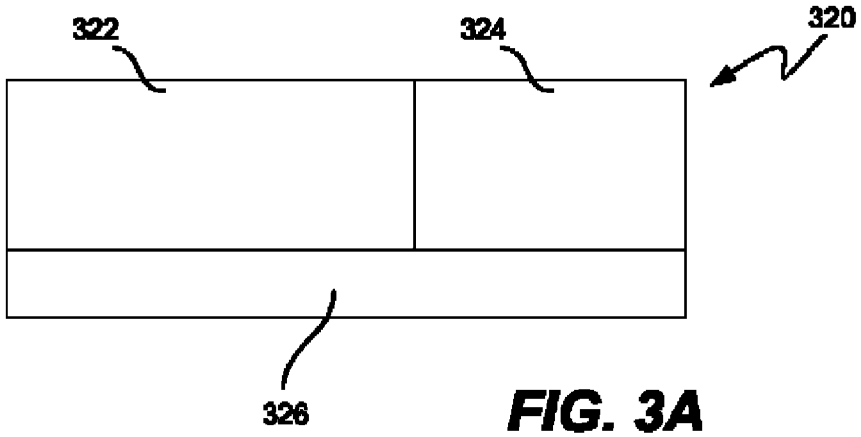
FIGS. 3A-C are views of touch screen displays with various configurations of associated physical buttons for use as input devices on a gaming machine.
Figure 3B:
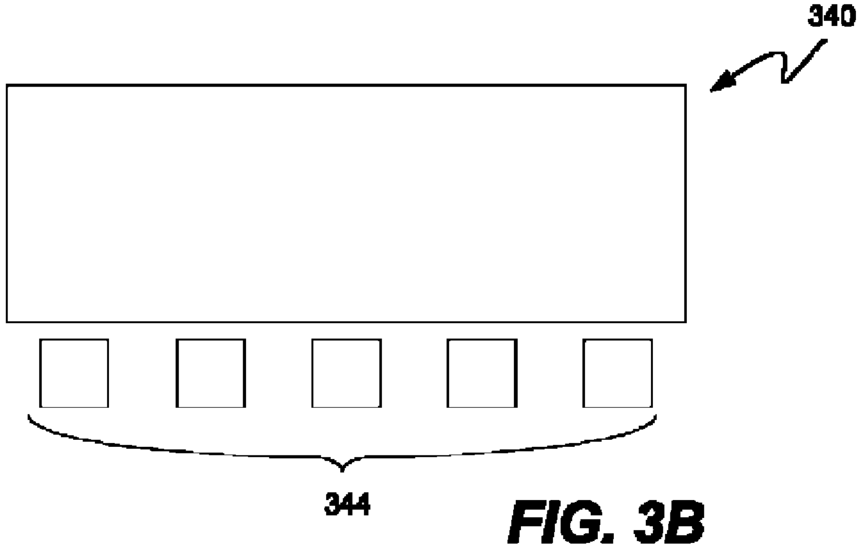
Figure 3C:
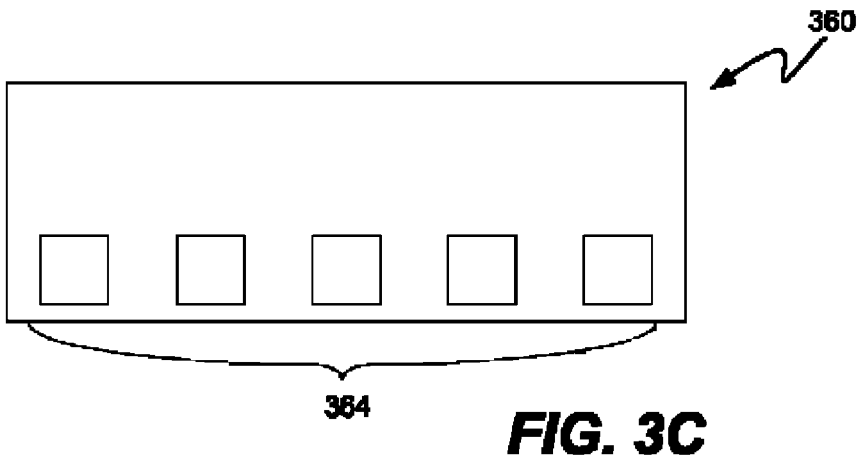

FIGS. 3A-C are views of touch screen displays for use as input devices on a gaming machine, with various configurations of associated physical buttons. The touch screen displays shown in FIGS. 3A-C may function as both a display device and an input device. FIG. 3A is a view of a touch screen display 320 with no physical buttons associated with the touch screen display. In some embodiments of the invention, the touch screen display is divided into different regions for displaying different information and for accepting different inputs. For example, area 326 might be used for displaying input selections and accepting player input for playing a game of chance on the gaming machine, area 322 might display information related to the game of chance, and area 324 might display player tracking information. The layout of the different areas and the information displayed in each area may vary according player specific preferences, the game being played, events occurring during the game being played, and the like.

FIG. 3B is a view of a touch screen display 340 with physical buttons 344 associated with the touch screen display. In some embodiments, input selections corresponding to each of the physical buttons are displayed on the touch screen display. A player might choose to use the physical buttons instead of providing player input with the touch screen display because he or she likes the tactile feedback that physical buttons provide. Touch screen display 340 is divided into different regions in some embodiments of the invention, similar to touch screen display 320. In further embodiments of the invention, 340 is a display only, with no touch screen overlaying the display. Embedding a display next to the physical buttons, with input selections corresponding to each of the physical buttons displayed on the display, serves as a direct replacement of dynamic buttons. Furthermore, the display also enables game play imagery and animations to be displayed which supplement or even replace animations on the main display. In some embodiments of the invention, however, dynamic buttons are used for the physical buttons in the touch screen display/physical button configuration shown in FIG. 3B.

FIG. 3C is a view of a touch screen display 360 with physical buttons 364 overlaying the touch screen display. In some embodiments of the invention, the physical buttons are transparent such that input selection information corresponding to the function of each of the physical buttons may be displayed on or though a physical button from the underlying display 360. In some embodiments of the invention, input from a physical button is detected by a physical button activating the touch screen. Touch screen display 360 is divided into different regions in some embodiments of the invention, similar to touch screen display 320. The operation and functionality of each of the touch screen displays with various configurations of associated physical buttons shown in FIGS. 3A-C is described herein.

Basically, a touch screen display generally includes a display and a touch screen. Some optically based touch screen displays, however, do not require a separate display and touch screen to sense input. Touch screen displays may also have a scratch resistant or other protective material overlaying the touch screen. This scratch resistant material may be a glass material or a plastic material, for example. A scratch resistant material is not generally used with some touch screen technologies, however, such as optically based touch screens using infrared emitters with infrared sensors, for example. The display may be any of a number of different types of high-resolution displays. For example, CRT displays, LED displays, OLED displays, LCD displays, displays using lasers, liquid crystal on silicon displays, 3-D displays, multi-layer displays, and front and rear projection displays may be used as the display for a touch screen display.

A touch screen generally overlays the display to form the touch screen display. The touch screen may be any of a number of different types of touch screens. For example, resistive based touch screens, capacitive based touch screens, surface acoustic wave touch screens, and optically based touch screens may be used as the touch screen for a touch screen display. Optically based touch screens may detect input above the display surface or based on detection of frustrated total internal reflectance. Capacitive based touch screens include projected capacitance touch screens. Some touch screens may employ two or more sensing technologies. Further descriptions of touch screen displays may be found in U.S. Pat. Nos. 6,712,698 and 7,294,059 which are herein incorporated by reference for all purposes. Touch screen displays are also described in U.S. patent application Ser. No. 10/662,755 entitled GAMING APPARATUS HAVING A CONFIGURABLE CONTROL PANEL, U.S. patent application Ser. No. 10/804,689 entitled TOUCH SCREEN APPARATUS AND METHOD, and U.S. patent application Ser. No. 10/955,679 entitled GAMING APPARATUS HAVING A CONFIGURABLE CONTROL PANEL, all of which are herein incorporated by reference for all purposes.

The touch screen may also be a multi-touch touch screen. Multi-touch touch screens are configured to detect multiple touches. Multi-touch touch screens enable a player to employ a wide range of motions and gestures to interact with and control the touch screen display. For example, these motions include “pinch-zoom”, “swipe”, “scroll”, and “rotate”.

FIGS. 4-9 are views of layouts of different input selections and different output information displayed on a touch screen display according to some embodiments of the invention. The touch screen displays shown in FIGS. 4-9 do not have physical buttons associated with them, similar to touch screen display 320 shown in FIG. 3A. Input selections indicate input areas on a touch screen display that a player may use for playing a game and to input other information to the gaming machine. Output information is information that is displayed on the touch screen display. In some instances, the output information presented on the touch screen display is driven by of the game shown on the main display of the gaming machine.

One concern regarding a server based gaming system is that the main display may appear cluttered and confusing to the player if too much different information is displayed. As an alternative to having the main display concurrently show the main game and content provided by a server, at least some of the server based content may be moved from the main display to the touch screen display. By physically separating the areas where different content is displayed (i.e., on the main display and on the touch screen display), distractions to game play can be minimized. Thus, for a gaming machine that is part of a server based gaming system, the output information displayed on the touch screen display may also be content, provided from a server, which is not associated with the game shown on the main display. Such content is also referred to as service window information. Service window information includes, for example, information regarding promotions from a casino in which the gaming machine is located, information regarding promotions from a manufacturer of the gaming machine, content from a web-camera in the casino where the gaming machine is located, player tracking information, and information about the one or more games of chance. As a further example of input selections and output information, the touch screen display may have input selections for displaying help or tutorial information for the game, including directions or suggestions on the use of the game and information about different wagers on the game. Such information may be displayed on the main display or the touch screen display. The touch screen display may also display output information informing the player that a show is about to begin or that a table at a restaurant is available. Various input selections and output information are further described herein.

In each of FIGS. 4-9, a different layout of input selections and/or output information that may be displayed on a touch screen display in embodiments of the present invention is shown. The layout of each different display of input selections and/or output information is for illustrative purposes only and is not limited to the layout in each of the figures. Further combinations of input selections and output information may be made using the input selections and output information shown in FIGS. 4-9. In alternative embodiments, the input selections shown in FIGS. 4-9 are associated with physical buttons, as described herein. For example, the input selections shown in FIGS. 4-9 may be associated with physical buttons that are adjacent to the touch screen, as shown in FIG. 3B. As another example, the input selections shown in FIGS. 4-9 may have physical buttons overlaying the input selections, as shown in FIG. 3C.

Figure 4:
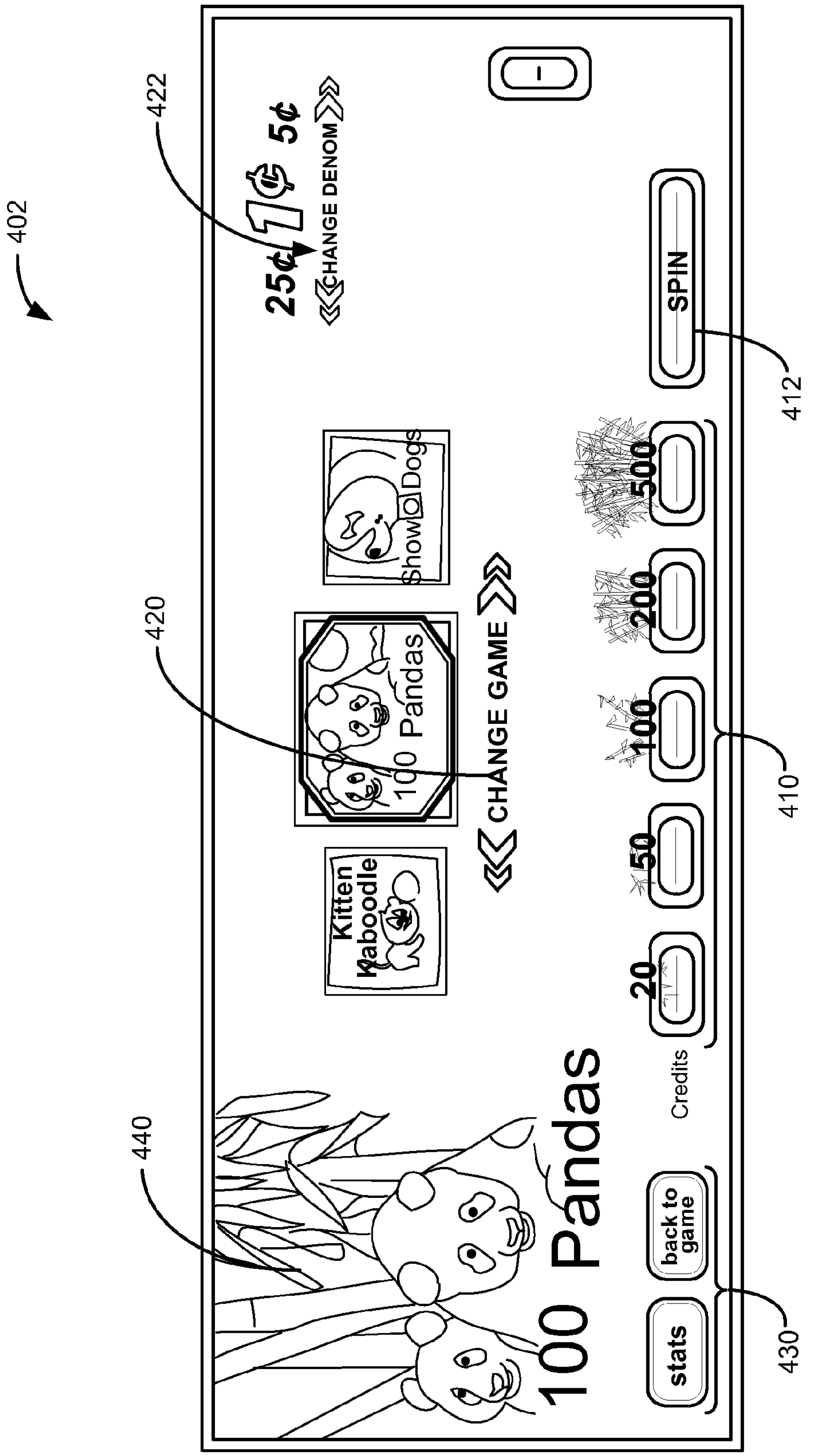
FIG. 4 is view of a touch screen display displaying input selections and output information.

FIG. 4 is a view of a touch screen display 402 displaying input selections and output information according to one embodiment of the invention. Input selections include input selections for playing a game of chance (410, 412), input selections for selecting features related to the game of chance (420, 422), and input selections for selecting features separate from play of the first game of chance 430. Output information includes the theme of the game being played 440. For instance, the theme of the game being played using touch screen display 402 is "100 Pandas."

Input selections for playing a game include selections for selecting an amount to wager 410 and an input selection for placing the wager 412 on the game. Input selections for selecting features related to the game include an input selection for changing the theme of the game being played 420 (e.g., changing the theme from "100 Pandas" to "Kitten Kaboodle"). Input selections for selecting features related to the game of chance may also include an input selection for changing the denomination of the gaming machine 422. The input selections for selecting features separate from the first game of chance 430 may result in the touch screen display displaying the layouts shown in FIGS. 5-9 or displaying other content.

The input selections 410, 412, 420, 422, and 430 may be displayed in different formats. Different format parameters associated with each input selection may include, but are not limited to: 1) a size of the input selection, 2) a shape of the input selection (e.g. square, oval, rectangular, star-shaped, n-sided polygon, etc), 3) a color scheme for the input selection, and 4) alpha-numeric text or symbols on the input selection. The input selections may be rendered in two dimensions.

In particular embodiments, the input selections may be rendered with surface shading and textures to appear three-dimensional and may be animated. For example, when an input selection is touched on the touch screen display, it may appear to move into the screen. Further, the symbols on the input selections may be appear to be animated in two dimensions or three dimensions. For instance, text on the input selections may appear to flash or move, or characters and symbols on the input selections may appear to move. The characters and symbols may be selected according to a theme of a game played on the gaming machine. For instance, for a "100 Pandas" themed game, an animation of a baby panda drinking may be used as an input selection to request a drink 430 on the gaming machine. In some embodiments, the layout of a display on the touch screen display may be customized according to the preferences of an individual player.

In further embodiments of the invention, the functions of a touch screen display are further expanded to include adjusting the display of the touch screen display based on events in the game. For example, the input selections and output information displayed on the touch screen display could change based on a player winning the game, a player being awarded a bonus, a player cashing out, and the like. The input selections and output information of the touch screen display could also change in response to a change in game mode, game theme, when different bets are available, and the like.

Figure 5:
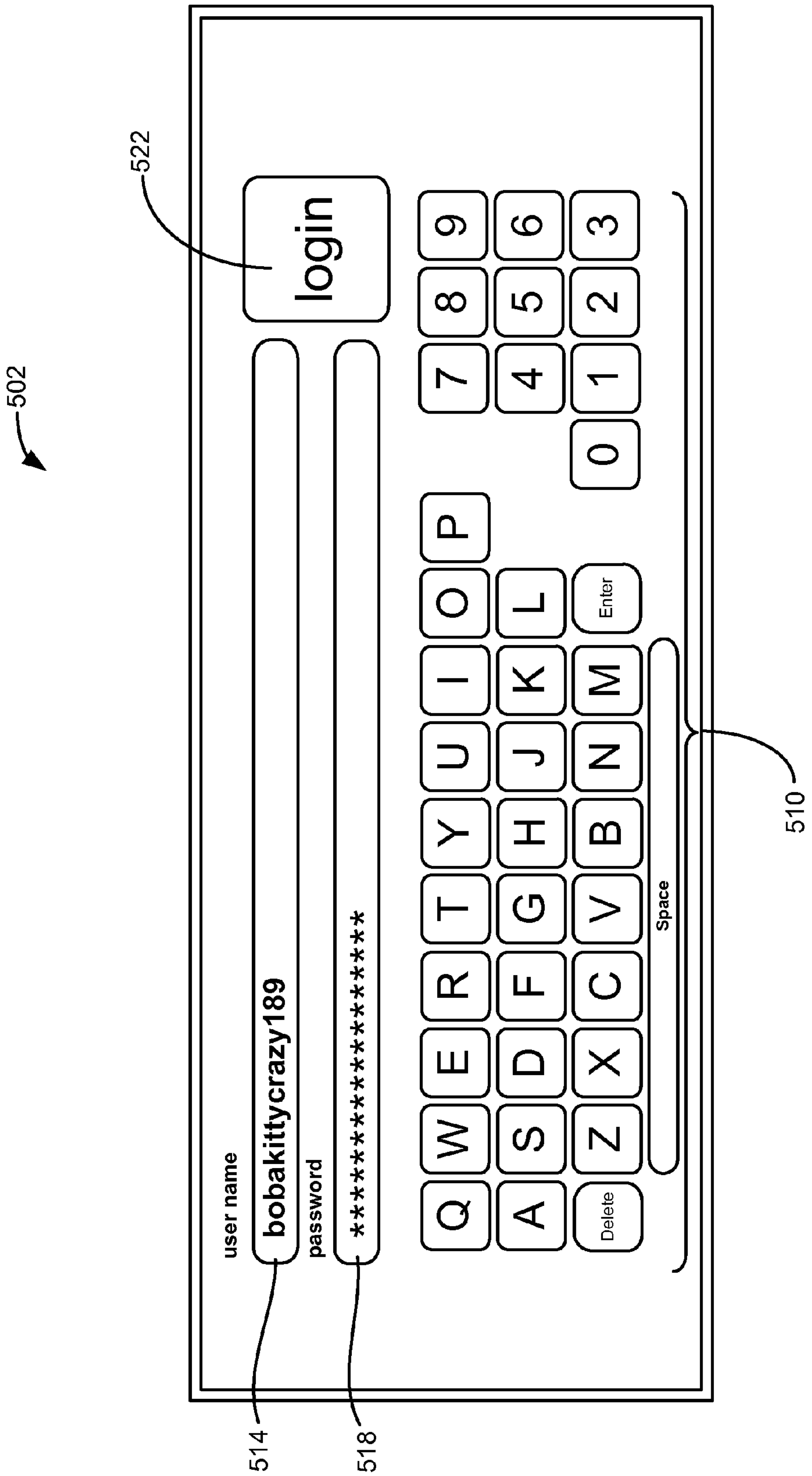
FIG. 5 is a view of a touch screen display displaying input selections comprising an alphanumeric keyboard.

FIG. 5 is a view of a touch screen display 502 displaying input selections comprising an alphanumeric keyboard 510 and an input selection 522 for logging into an account, according to one embodiment of the invention. Touch screen display 502 has two areas for output information corresponding to a user name 514 that a player enters and corresponding to a password 518 that a player enters. Touch screen display 502 is configured for logging into an account. One account that a player may log into when playing a game of chance on a gaming machine is a player tracking account. Player tracking accounts are further described in U.S. Pat. No. 6,712,698, previously incorporated by reference. A gaming machine manufacturer may also set up a loyalty program in which a player is rewarded for using gaming machines manufactured by the manufacturer. In this case, to keep track of a player usage of the manufacturer's gaming machines, the manufacturer may set up an account into which a player may log into when playing a gaming machine manufactured by the manufacturer. The display shown in FIG. 5 may be shown at the beginning of a gaming session, such that the player can log into an account and all play by the player may be tracked and/or credited.

In some embodiments of the invention, the touch screen display may change from the display shown in FIG. 4 to the display shown in FIG. 5 (and also the displays shown in FIGS. 6-9) in response to an event in a gaming session. Such a change may be instantaneous and occurring with no input from the player. For example, if a player wins an award on the gaming machine, display 502 may be shown so that the player can enter a home address to which the award will be delivered. As another example, the display shown in FIG. 5 may appear if a player is awarded a bonus.

A login interface in the form of an alphanumeric keyboard could be displayed on a main display/touch screen. However, the touch screen display providing a login interface provides at least two advantages. A login interface on a touch screen display offers a player privacy when setting up an account or entering login information, such as a personal player information, passwords, Personal Identification Numbers (PIN), or the like. Furthermore, as described herein, the ergonomics of entering information on a touch screen display are generally better than entering information on the touch screen/main display. In further embodiments, an alphanumeric keyboard interface on the touch screen display could be used for Internet access, text messaging within a casino, and the like. For example, a player could use an alphanumeric keyboard interface on the touch screen display to set up an account with the casino or the manufacturer of the gaming machine via an Internet connection. In yet further embodiments, an alphanumeric keyboard interface on the touch screen display might be displayed on a group of gaming machines that are part of a gaming system for login for tournament play and the like.

Figure 6:
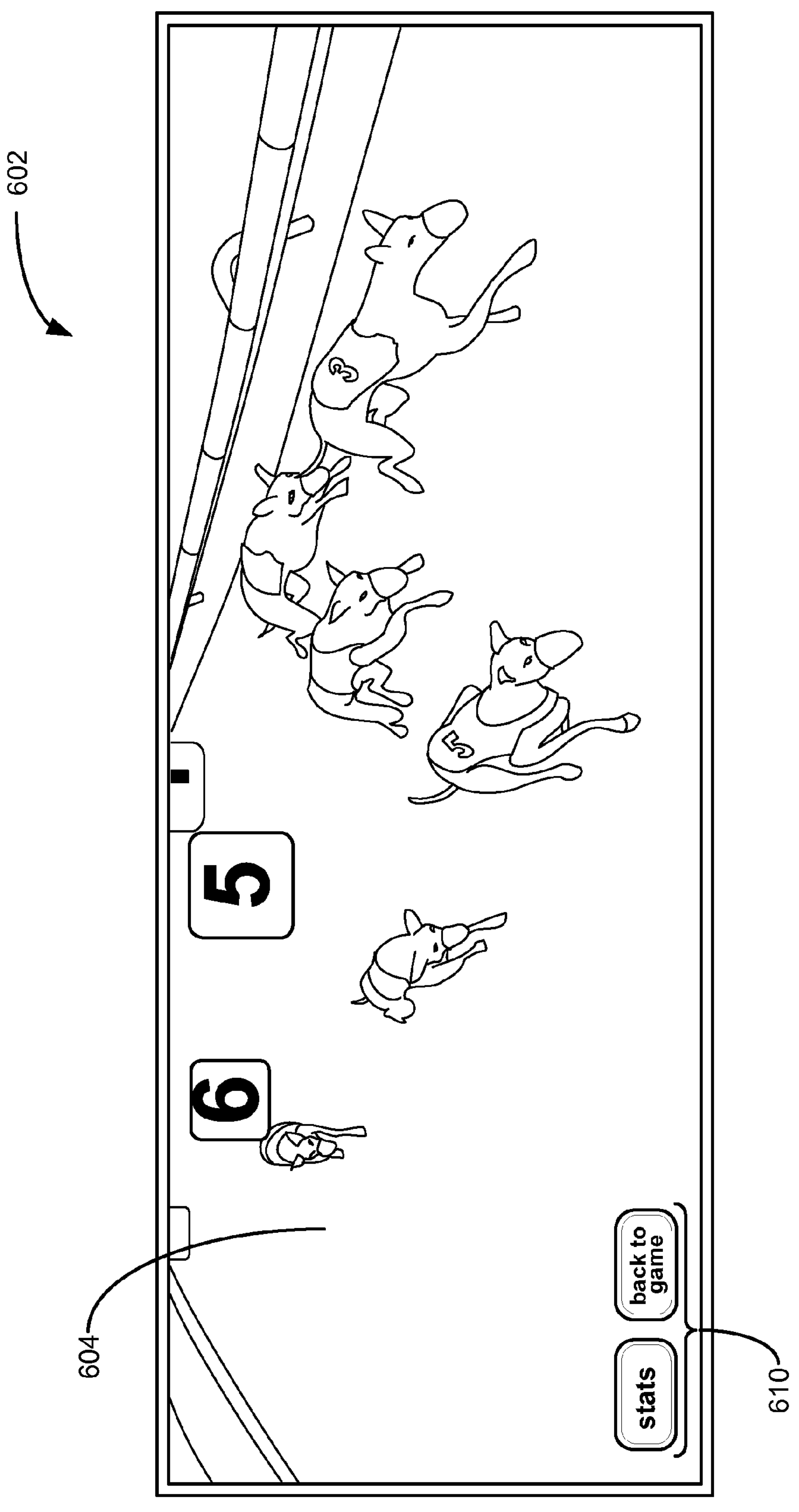
FIG. 6 is a view of a touch screen display displaying information associated with an auxiliary view of a game.

Turning now to FIG. 6, newer games increasingly provide players alternative or even multiple concurrent 'portals' from which to view and participate in game play. For example, with a single display, a player may be given a choice of viewing a car race from either a driver or aerial perspective. With the display of a touch screen display, the player can have two physically distinct screens (i.e., the main display and the touch screen display) which concurrently offer both views. In this way, the touch screen display complements game play occurring on the main display.

FIG. 6 is a view of touch screen display 602 displaying output information associated with an auxiliary view of a game 604 and input selections 610 according to one embodiment of the invention. Input selections 610 are input selections for selecting features separate from play of a game of chance. For example, input selections 610 may be configured to change the perspective of the game shown on the main display and/or the touch screen display. On touch screen display 602, a view of a dog race from the perspective of a camera just in front of the dogs on a dog track is shown. This view on the touch screen display would complement, for example, an overhead view of the dog track shown on the main display. Other auxiliary views of the dog race could also be provided on the touch screen display. The particular auxiliary view shown on the touch screen display may be player selectable.

In some embodiments of the invention, the touch screen display 602 may change from the display shown in FIG. 6 to other auxiliary views of the dog race. For example, after all of the dogs run by one corner of the track, the view may instantaneously change to the next corner of the track that the dogs will run around. In another embodiment of the invention, the display shown in FIG. 6 may be instantaneously displayed on the touch screen display to inform the player that the dog race they placed a wager on is starting. This might occur, for example, while the player is playing a game of video poker.

In further embodiments of the invention, a player may be playing a slot-based game on a gaming machine. The player may have also placed a wager on a real or virtual sports game. The touch screen display may be configured to display the sports game (such as the dog race shown in FIG. 6) on one half of the touch screen display and to display input selections and output information related to the slot-based game on the other half of the touch screen display. With this display, the player would be able to keep playing the slot-based game while monitoring the progress of the sports game.

Figure 7:
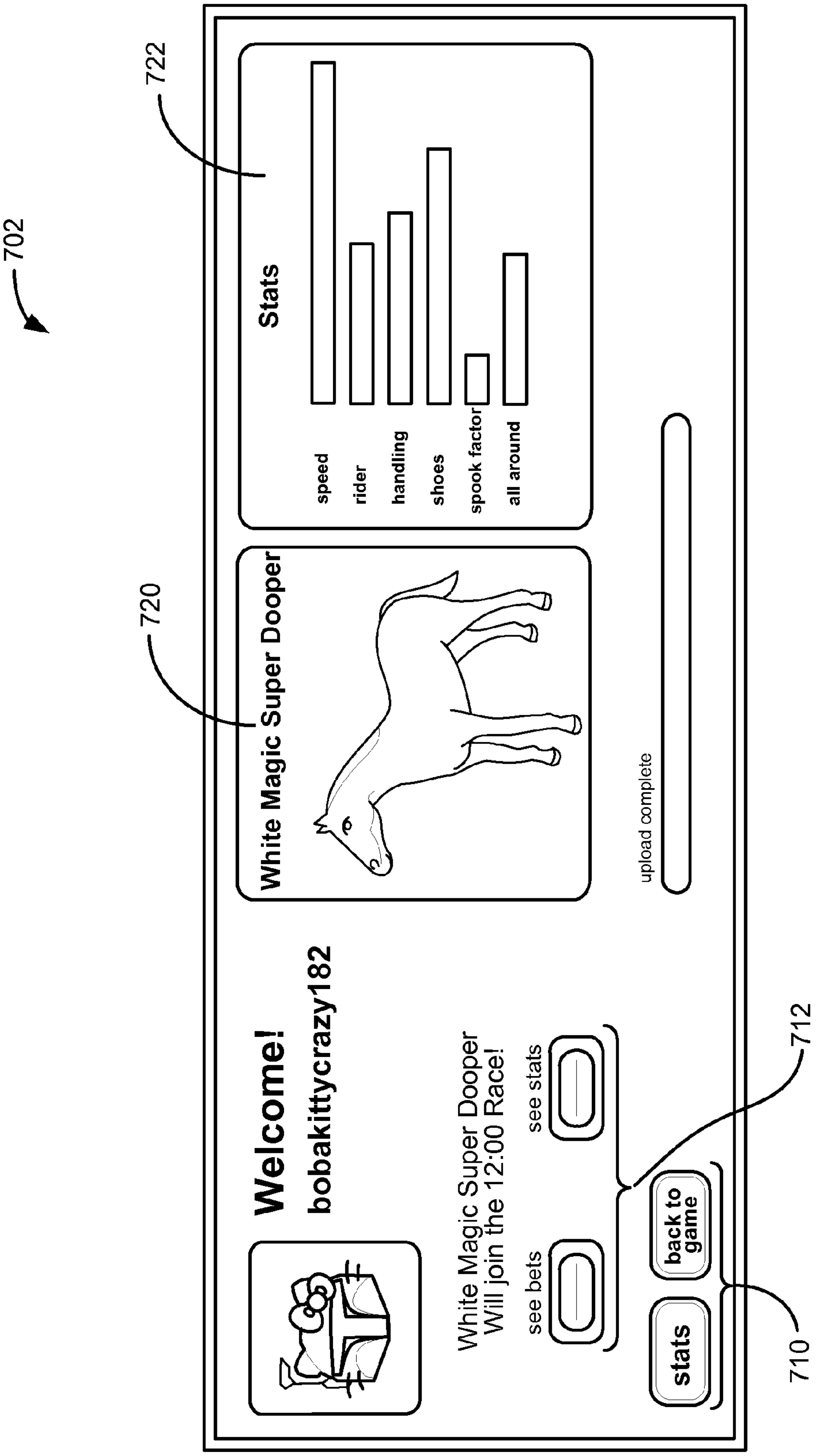
FIG. 7 is a view of a touch screen display displaying input selections and output information.

FIG. 7 is a view of a touch screen display 702 displaying input selections (710, 712) and output information (720, 722) according to one embodiment of the invention. On touch screen display 702, a horse that a player may choose for a virtual horse race is shown. Alternatively, the horse may be a real horse that is about to run in a race that the player wishes to place a wager on. The horse is shown in output information 720 and the statistics relating to the particular horse are shown in output information 722. Input selections 710 may allow a player to select further statistics about the horse shown in output information 720, select another horse to view, or exit from the horse betting application. Input selections 712 may allow a player to see the bets placed on the horse as well as to see further statistics related to the horse.

In some embodiments of the invention, the touch screen display may display content as shown in FIG. 7 when a horse race the player expressed interest in is about to start. For example, when the player is playing a game on the gaming machine, the display in FIG. 7 may instantaneously be displayed five minutes before the horse race starts so that the player may have enough time to place a bet. Alternatively, the horse race might be part of a bonus game that is awarded to the player.

Figure 8:
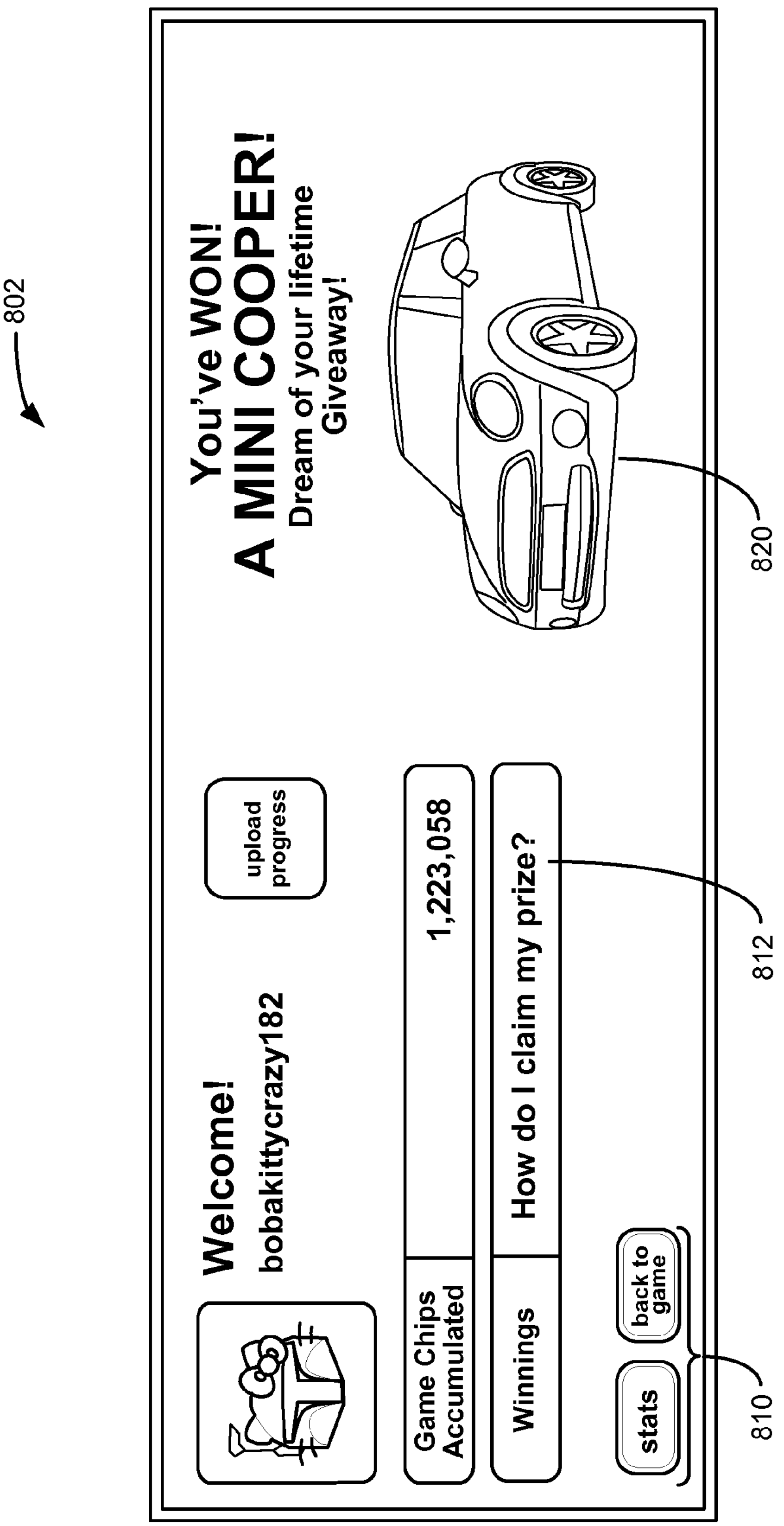
FIG. 8 is a view of a touch screen display displaying a prize won by a player.

FIG. 8 is a view of a touch screen display 802 displaying a prize 820 won by a player and input selections (810, 812) according to one embodiment of the invention. This display might be instantaneously displayed when a player has won prize 820. Input selections 810 and 812 are input selections for selecting features separate from play of a game of chance. Input selections 810 may allow the player to select further information about the prize or to return to playing a game of chance. Input selections 812 may allow the player to see their winnings and to see how to claim the prize. The prize could be awarded from the casino in which the gaming machine is located for winning a game of chance, as part of a loyalty program, or the like. Alternatively, the prize could be awarded from the manufacturer of the gaming machine.

In some embodiments of the invention, the touch screen display may display content as shown in FIG. 8 as part of the attract mode of a game play session. For example, the display in FIG. 8 may be displayed to encourage players to play the gaming machine because they might win the prize. In a further embodiment, touch screen display might be used to advertise a tournament when the prize for winning the tournament is prize 820. The time of the tournament and the betting requirements for the tournament might also be displayed.

Figure 9:
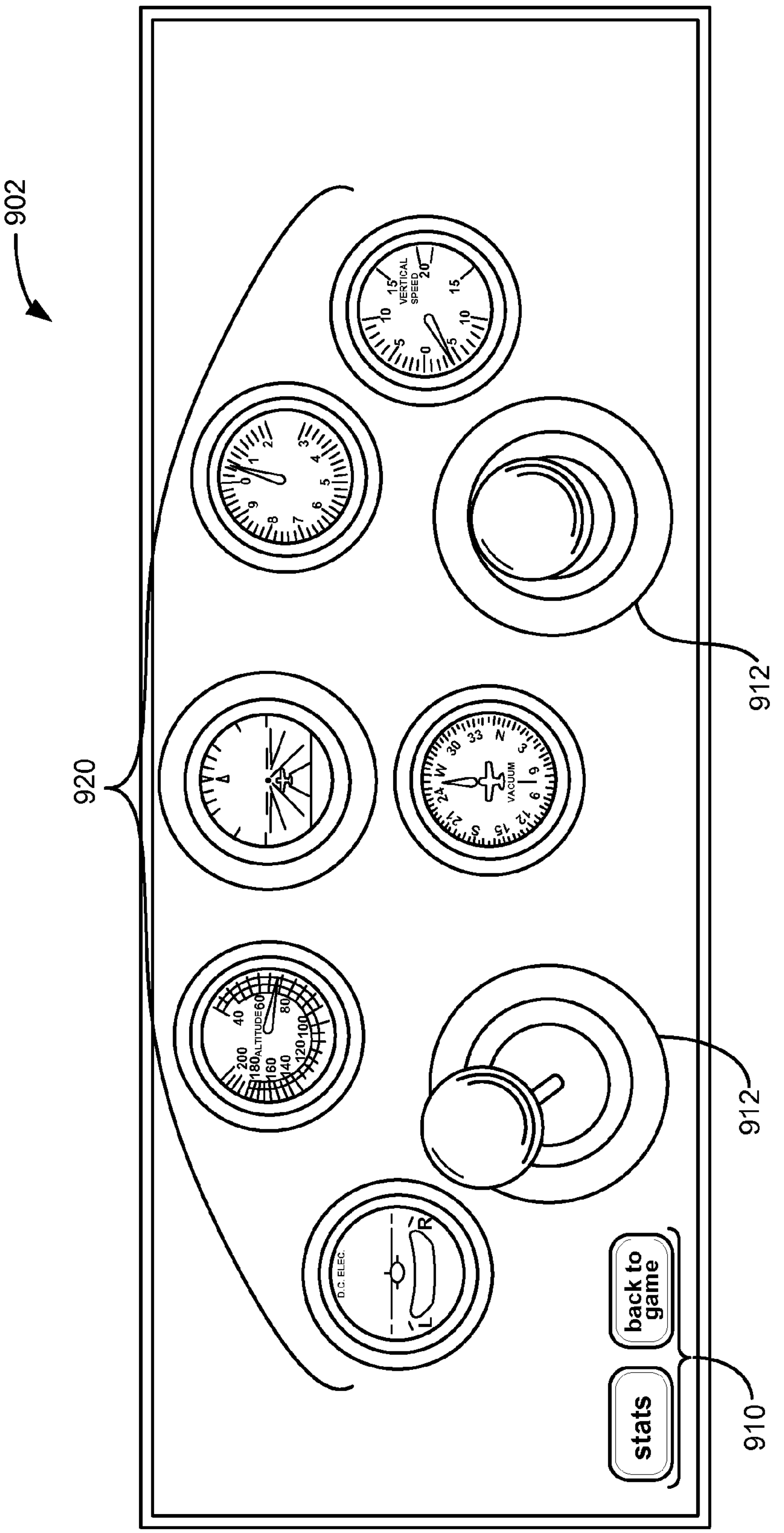
FIG. 9 is a view of a touch screen display displaying input selections for playing a second game and output information related to the second game.

Turning to FIG. 9, there may be instances when the main game on a gaming machine is not usable. This may occur more often in a gaming machine that is part of a server based gaming system than with a standalone gaming machine. For example, Nevada regulations currently require that a game be disabled for four minutes following a change in software (game download, paytable change, etc.). The gaming machine may also enter into a mode in which the main game is inoperable pending interaction by an operator (e.g., locking when an operator is required to handpay a winning) During such an interval, the touch screen display may be configured to provide a second game. The game might be a wager-based game on the gaming machine for which the software has not changed. This might include an interface to a centralized Bingo or Keno game, participation in a sports betting event, or a simplified gaming applet. Alternatively, the game could be a game of skill provided such that the player may be entertained while waiting for the gaming machine and/or operator. The second game might also be part of a bonus award. In some instances, the second game may be displayed on the main display and input selections for the second game provided on the touch screen display. In other instances, both the second game and input selections for the second game may be displayed on the touch screen display.

FIG. 9 is a view of a touch screen display 902 displaying input selections for playing a second game and output information related to the second game, according to one embodiment of the invention. As explained herein, a second game may be available for play by a player when the main game on a gaming machine is inoperable. Touch screen display 902 displays input selections and output information for a flight simulator. For such a second game, the main display of the gaming machine would display the graphics associated with the flight simulator (i.e., the view from the cockpit of the aircraft). Input selections 912 allow the player to control the aircraft. Input selections 910 are input selections for selecting features separate from play of a game. Input selection 910 may allow the player to see their performance in the game of skill or to select another game of skill to play. Output information 920 are instrumentation associated with the aircraft of the flight simulator.

Figure 10A:
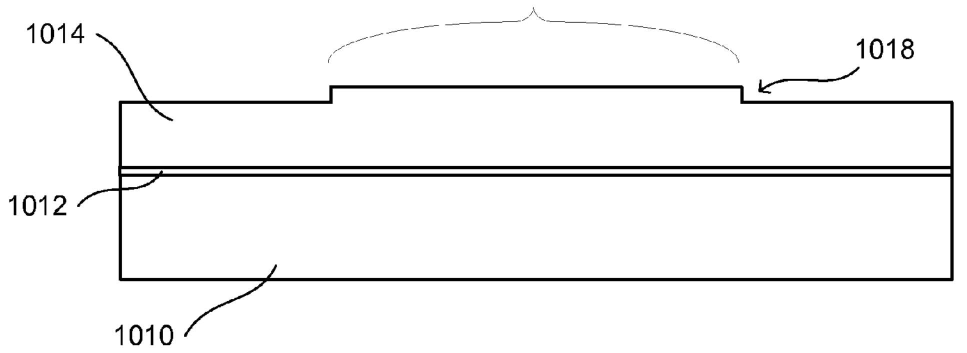
FIGS. 10A-B are views of a light pipe overlaying a touch screen display.

In some embodiments of the invention, the touch screen display incorporates light pipes in a material overlaying the touch screen. These light pipes may be placed over the input selections or output information displayed on the touch screen display. Generally, a light pipe refers a tube or pipe for transport of light to another location, minimizing the loss of light. As used herein, a light pipe is a portion of the material overlaying a touch screen display such that the input selections or output information is elevated above the other portions of the touch screen display. Touch screens that may be used with light pipes include projected capacitance touch screens. See, for example, FIG. 10A. FIG. 10A is a cross-sectional view of a light pipe overlaying a touch screen display according to one embodiment of the invention. FIG. 10A shows display 1010, touch screen 1012, and material 1014 overlaying touch screen 1012, including light pipe 1016. With light pipe 1016, an input selection or other output information displayed on display 1010 appears to be elevated and set apart from the other content shown on the touch screen display. The light pipe portion 1016 of material 1014 may be elevated at different levels from the surface of material 1014. That is, the distance 1018 may vary from, for example, from 1 mm to 5 mm. In some embodiments of the invention, when the material 1014 overlaying touch screen 1012 incorporates multiple light pipes, the elevation of each light pipe from the surface of material 1014 may vary. In further embodiments, the surface of light pipe 1016 is not flat as shown in FIG. 10A, but is concave, convex, or incorporates other surface features.

Figure 10B:
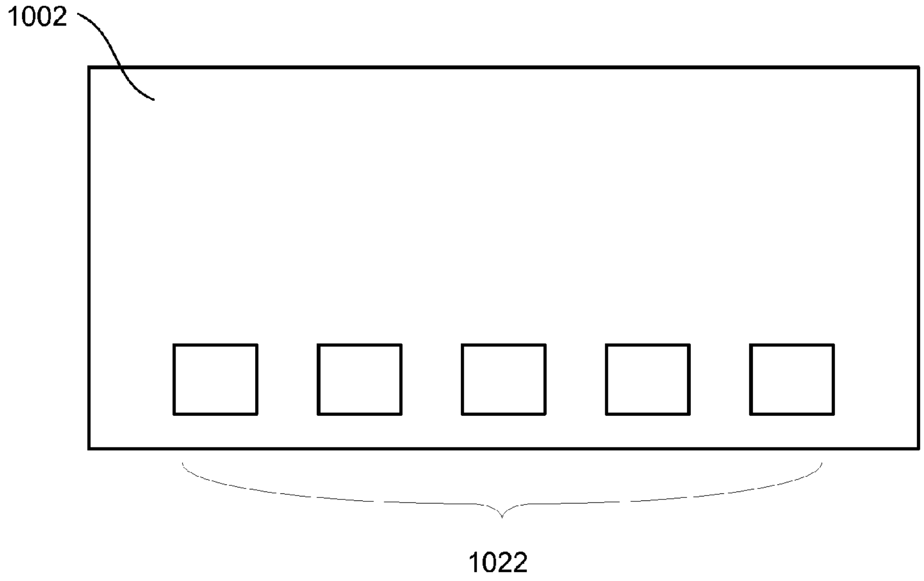

FIG. 10B shows a touch screen display 1002 with light pipes 1022 incorporated with a material overlaying the touch screen, the light pipes in positions where input selections would typically be displayed on the touch screen display. For example, light pipes 1022 might overlay each of input selections 410 and 412 shown in FIG. 4. Light pipes 1022 may be in any shape, including squares, rectangles, and circles, and the like. Light pipes 1022 may also be formed such that they match the shape of the input selections to be displayed on touch screen display 1002. Light pipes incorporated with a material overlaying a touch screen of a touch screen display do allow for the input selections to be set apart from the other material displayed on the touch screen display. Light pipes may also enlarge or magnify an image displayed on the touch screen display, presenting an image on a light pipe substantially larger than the image displayed on the touch screen display. However, overlaying a touch screen with a material including light pipes does take away from the configurability and adaptability of the touch screen display. The material including light pipes, being physical, would need to be changed if the owner of the gaming machine desired to change the shapes of the light pipes or the number of light pipes.

Figure 11:
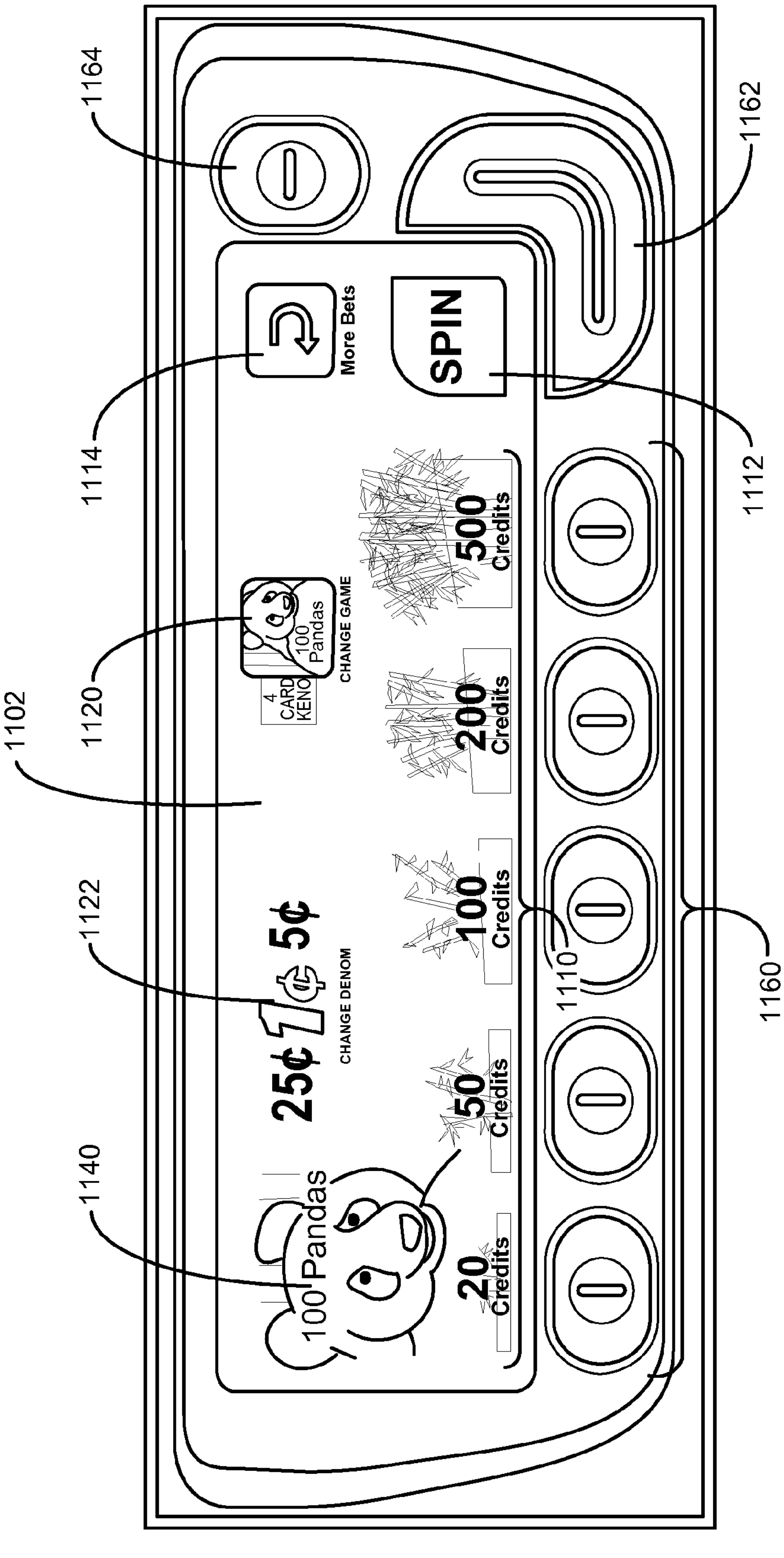
FIG. 11 is a view of a touch screen display with associated physical buttons.

While a touch screen display is easily reconfigurable and adaptable, some players prefer the tactile feedback that physical buttons provide. FIG. 11 is a view of a touch screen display 1102 with associated physical buttons (1160, 1162, 1164) according to one embodiment of the invention. Touch screen display 1102 displays input selections and output information. The configuration of the touch screen display with associated physical button shown in FIG. 11 is similar to the touch screen display 340 with associated physical buttons 344 shown in FIG. 3B. The input selections and output information shown on touch screen 1102 are similar to the input selections and output information shown on touch screen display 402 in FIG. 4. Similar to touch screen display 402, input selections include input selections for playing a game of chance (1110, 1112, 1114) and input selections for selecting features related to the game of chance (1120, 1122). Output information includes the theme of the game being played 1140. For instance, the theme of the game being played using touch screen display 1102 is "100 Pandas."

Input selections for playing a game include selections for selecting an amount to wager 1110, an input selection for placing the wager 1112, and an input selection for selecting more bets 1114. Input selections for selecting features related to the game of chance include an input selection for changing the theme of the game being played 1120 (e.g., changing the theme from "100 Pandas" to "Kitten Kaboodle"). Input selections for selecting features related to the game may also include an input selection for changing the denomination of the gaming machine 1122. As with touch screen display 402, the input selections of touch screen display 1102 may be displayed in different formats.

Touch screen display 1102 further has physical buttons associated with the touch screen display. Physical buttons 1160 correspond to input selections 1110, physical button 1162 corresponds to input selection 1112, and physical button 1164 corresponds to input selection 1114. Thus, if a player wishes to have the tactile feedback provided by physical buttons, the player may use physical buttons 1160, 1162, and 1164 for playing a game instead of the input selections on the touch screen display. Or, if the player prefers a touch screen, the player may still use the input selections on the touch screen display.

Physical buttons 1160, 1162, and 1164 may be any of a number of different types of buttons. The physical buttons may include mechanical actuators, touch sensors, electromagnetic sensors, or other sensors for detecting input. The physical buttons may be connected along a strip of ribbon cable. The physical buttons may interface with a respective ribbon cable PCB connector on the ribbon cable. Each ribbon cable PCB connector on the ribbon cable may have a specific address, so different buttons are separately addressable. The ribbon cable may be connected at one end to a panel configuration board. The panel configuration board may be electrically connected to a controller, such as the "Black-Fin" controller available from IGT, by a cable (e.g., an HDMI cable). The panel configuration board may have DIP switches, which identify a button panel configuration.

The panel configuration board may provide signals carried on the ribbon cable to the cable that leads to the Black-Fin controller. The panel configuration board may also communicate the configuration of the button panel as governed by the DIP switches. The Black-Fin controller may control the buttons via the panel configuration board and, in one or more embodiments, may control other devices of the gaming machine, such as bonus wheels. The Black-Fin controller may also be connected to the gaming machine processor.

Figure 12A:
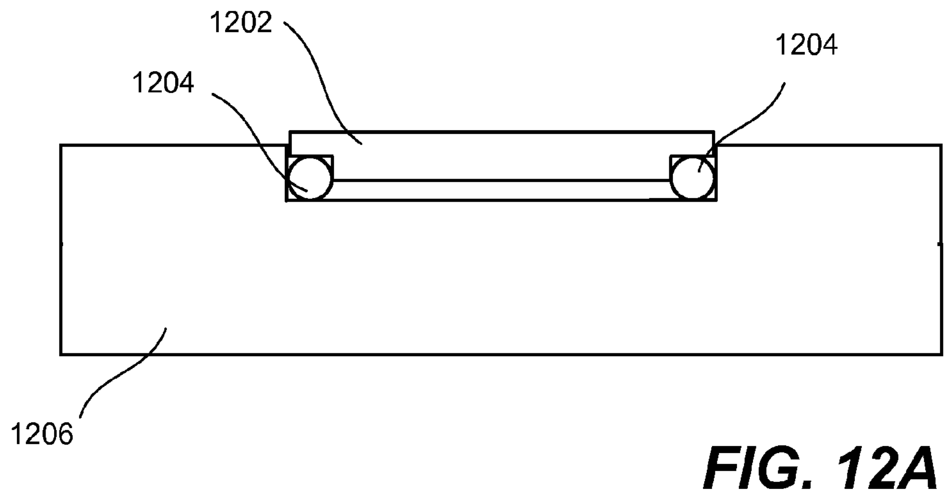
FIGS. 12A-B are cross-sectional views of a physical button with an electroactive polymer as the actuator.
Figure 12B:
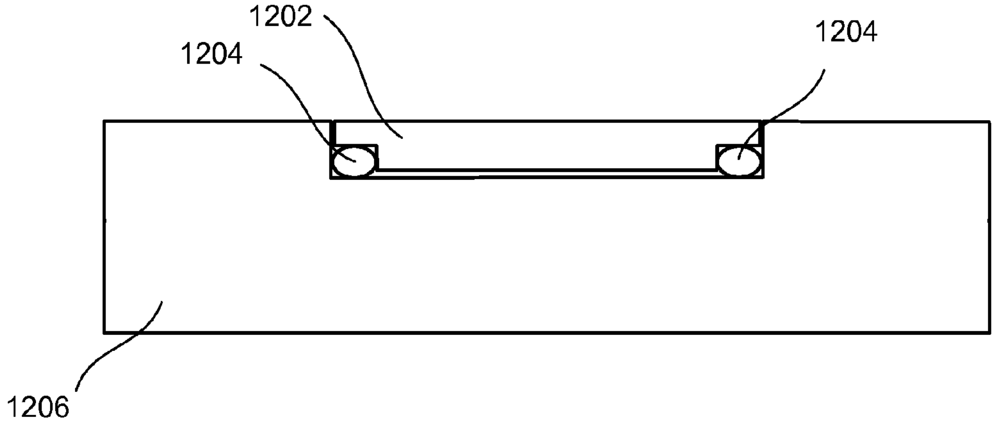

Physical buttons may also incorporate an electroactive polymer (a type of polymer material) acting as an actuator. Electroactive polymers are alternatively known as artificial muscle. Examples of electroactive polymers suitable for embodiments of the invention are available from Artificial Muscle, Inc. of Sunnyvale, Calif. When acting as an actuator, an electroactive polymer produces a signal when it is deformed. FIGS. 12A-B are cross-sectional views of a physical button with an electroactive polymer as the actuator according to one embodiment of the invention. Other configurations of using an electroactive polymer as an actuator are possible. FIG. 12A shows a physical button 1202, electroactive polymer 1204, and the panel in which the physical button is mounted 1206. In FIG. 12A, the physical button is at a raised level (i.e., a player is not pushing the physical button). At the raised level, the physical button is not compressing the electroactive polymer and causing it to generate a signal. In FIG. 12B, the physical button is at a depressed level (i.e., a player is pushing the physical button). At the depressed level, the physical button is compressing the electroactive polymer and causing it to generate a signal that is sensed as input.

Electroactive polymers also have the property of changing shape when a voltage is applied to them. One type of electroactive polymer is dielectric electroactive polymer. In some configurations, a layer of electroactive polymer is placed between two electrodes. When a voltage is applied across the electrodes, the electroactive polymer changes shape. Using a control circuit (not shown) to provide various voltage signals to a electroactive polymer, electroactive polymers can be used to make the physical button vibrate. By tailoring the frequency of the vibration of a physical button, different tactile sensations that may be sensed by a player may be produced. For example, the frequency of vibration of the physical button could be tailored to make the button feel like a liquid or to feel like sandpaper. In some embodiments of the invention, the control circuit is in communication with the gaming controller and controls the vibration of the electroactive polymer in response to events occurring during play of the game. Such events include, for example, a player winning the game, a player being awarded a bonus, a player cashing out, and the like. Thus, for example, when the player wins the game, the main display may show graphics indicating that the player has won, complemented by the physical button vibrating, also indicating that the player has won.

In further embodiments of the invention, the control circuit is used to vary the physical characteristics of the electroactive polymer (e.g., compressibility and modulus of elasticity) to control the tactile feedback that the physical button provides to a player. For example, the tactile sensation that a player feels with his or her finger or fingers when pressing a physical button from a raised level to a depressed level can be altered. This allows the tactile feedback provided by a physical button to be tailored to the greatest extent possible.

In another embodiment of the invention, an electroactive polymer is coupled to a touch screen display. For example, touch screen display 320 shown in FIG. 3A could be coupled to an electroactive polymer. Such a coupling might be accomplished, in one configuration, by coupling the bottom surface of the touch screen display (i.e., the portion of the touch screen display that the player does not interact with) with an electroactive polymer. With such a configuration, a control circuit can be used to cause the electroactive polymer to vibrate, causing the entire touch screen display to vibrate/move. Thus, the touch screen display itself could provide tactile feedback to a player. This tactile feedback could simulate many different sensations, such as the texture of sand, the edge of a knife, or indexed detents and ratcheting. Furthermore, since the tactile feedback may be applied in the plane of the touch screen or perpendicular to the touch screen (i.e., the touch screen may vibrate/move in an XY plane as well Z direction), tactile effects may be generated to simulate the desired effect. For example, when a player's finger touches an input selection on the touch screen display, the touch screen display might vibrate or thump, indicating that the input selection has been received. The touch screen might also vibrate or thump in response to events occurring during play of the game.

In some embodiments of the invention, physical buttons are overlaid on a touch screen display, creating a hybrid touch screen display. In further embodiments of the invention, only a portion of the touch screen display is overlaid with physical buttons. Such an embodiment is shown in FIG. 3C. When a touch screen display is overlaid with physical buttons that are translucent, the touch screen display may serve as a light source for lighting each physical button and indicating the function of a physical button. Also, each physical button contacts a fixed point on the touch screen display, eliminating the need for other button actuation means (i.e., the touch screen acts as the actuation means for the physical button). An example of a button panel assembly that might be modified to provide a physical button overlay for a touch screen display is described in U.S. patent application Ser. No. 11/595,555 entitled BUTTON PANEL WITH PRINTED CIRCUIT BOARD, which is herein incorporated by reference for all purposes There are several additional advantages of overlaying the touch screen display or a portion thereof with translucent physical buttons. First, there are more options for game design with respect to control of lighting the physical buttons. The physical buttons can use the full range of colors and intensities offered by the underlying display. Second, because the physical buttons are merely an overlay on top of the touch screen display, in some embodiments of the invention, there are no openings around them that enable fluids to contaminate switches or other electronics. Third, changing the number of physical buttons merely requires changing the overlay and adjusting the software function supporting the physical buttons. While this does limit the configurability and adaptability of a touch screen display, changing the overlay on a touch screen display is less costly and time intensive than changing the number of buttons on a traditional button panel, for example. Fourth, the amount of travel and the detent which provides tactile feedback for a physical button can be tailored by changing the materials and/or geometry of the physical buttons.

Figure 13A:
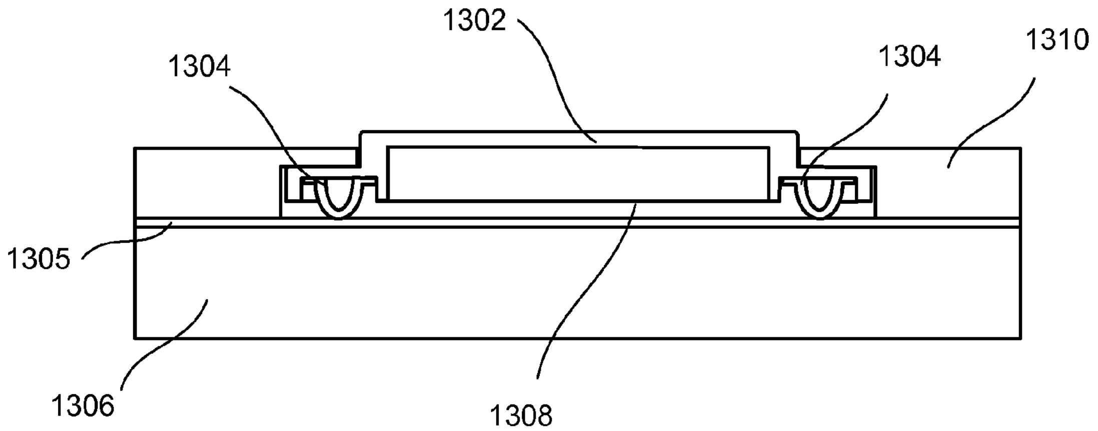
FIGS. 13A-B are cross-sectional views of an embodiment of the invention with a physical button overlaying a touch screen display.
Figure 13B:
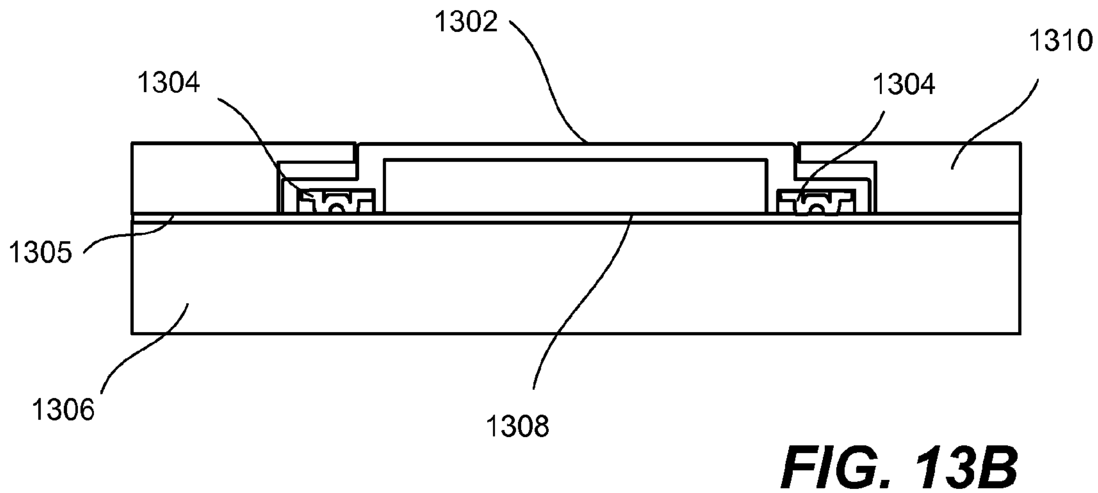

FIGS. 13-15 show cross-sectional views of a physical button overlaying a touch screen, according to different embodiments of the invention. In some embodiments of the invention, the physical button is translucent, such that the information displayed on the display is visible though the physical button. This information may include an indication of the input selection that the physical button corresponds to. FIGS. 13A-B are cross-sectional views of an embodiment of the invention of a physical button overlaying a touch screen display. FIG. 13A shows physical button 1302, support member 1304, touch screen 1305, display 1306, and material 1310 overlaying the touch screen. In FIG. 13A, the physical button is at a raised level (i.e., a player is not pushing the physical button). At the raised level, the bottom surface 1308 of the physical button is not in contact with the touch screen and not a generating a signal on the touch screen. In FIG. 13B, the physical button is at a depressed level (i.e., a player is pushing the physical button). At the depressed level, the bottom of the physical button is in contact with the touch screen and is generating a signal that is sensed as input with the touch screen.

Suitable materials with which a physical button may be constructed include plastics, glasses, and transparent versions of these materials. The support member is made from a material that is compressible but will return to its original shape after a force compressing the material is removed. Examples of suitable materials for the support member include polymeric materials. In other embodiments of the invention, the support member is an electroactive polymer. With an electroactive polymer support member, the tactile feedback that the physical button provides can be further tailored, as described herein.

In alternative embodiments of the invention, a transparent physical button overlays a portion of the display and a touch screen overlays a different portion of the display. An electroactive polymer incorporated with the physical button acts as an actuator for the physical button. With this configuration, the display may display an indication of the input selection that the physical button corresponds to, providing a physical button that is adaptable and configurable.

Figure 14A:
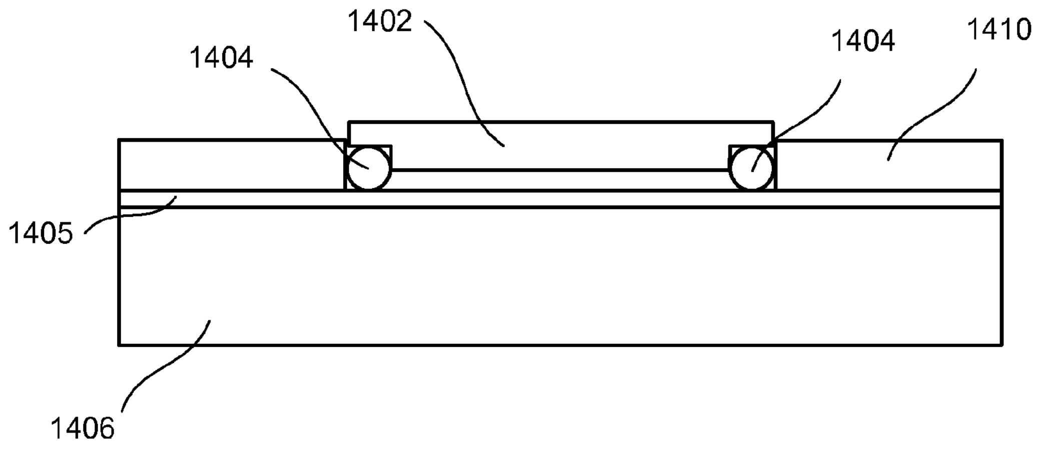
FIGS. 14A-B are cross-sectional views of another embodiment of the invention with a physical button overlaying a touch screen display.
Figure 14B:
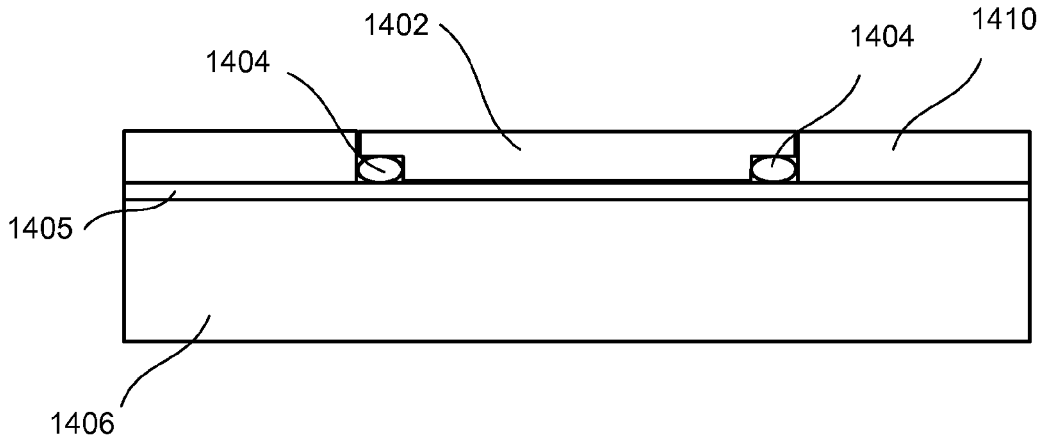

FIGS. 14A-B are cross-sectional views of another embodiment of the invention of a physical button overlaying a touch screen display. FIG. 14A shows physical button 1402, support member 1404, touch screen 1405, display 1406, and material 1410 overlaying the touch screen. In FIG. 14A, the physical button is at a raised level (i.e., a player is not pushing the button). At the raised level, the bottom surface 1408 of the physical button is not in contact with the touch screen and not a generating a signal with the touch screen. In FIG. 14B, the physical button is at a depressed level (i.e., the player is pushing the button). At the depressed level, the bottom of the physical button is in contact with the touch screen and is generating a signal that is sensed as input with the touch screen.

In some embodiments of the invention, the support member is attached to the physical button, to the touch screen, and to the material overlaying the touch screen. With a support member attached to the surfaces that the support member is in contact with, the support member acts as a seal. That is, the support member seals the area around the physical button such that contaminants, including liquids, cannot come into contact with the touch screen portion that the physical button overlays.

Figure 15A:
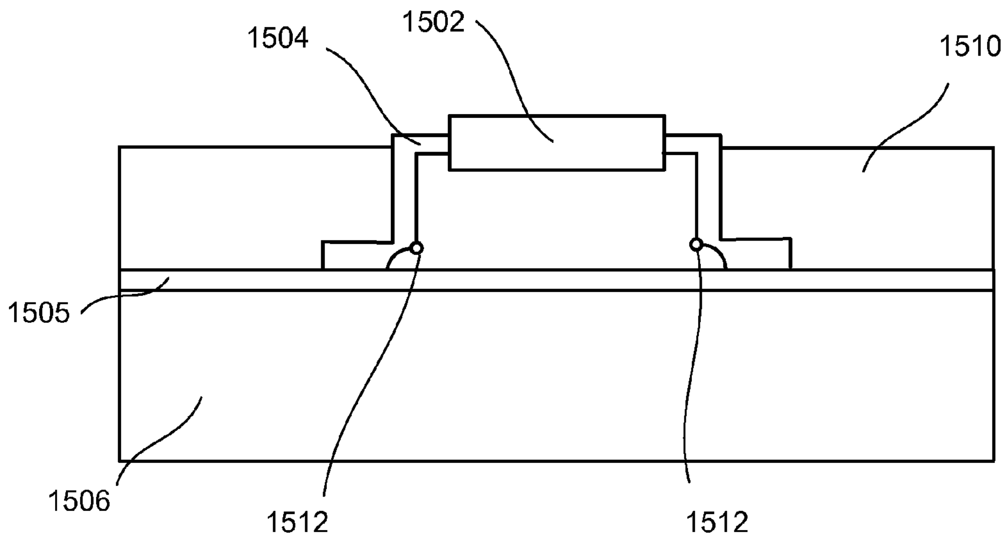
FIGS. 15A-B are cross-sectional views of a further embodiment of the invention with a physical button overlaying a touch screen display.
Figure 15B:
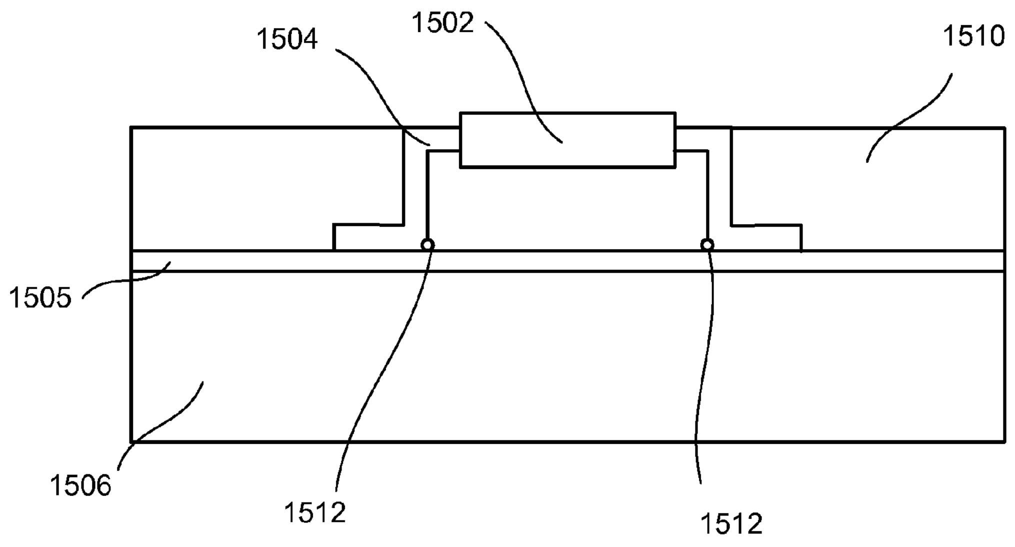

FIGS. 15A-B are cross-sectional views of a further embodiment of the invention of a physical button overlaying a touch screen display. FIG. 15A shows physical button 1502, support member 1504, contact points 1512, touch screen 1505, display 1506, and material 1510 overlaying the touch screen. In FIG. 15A, the physical button is at a raised level (i.e., a player is not pushing the button). At the raised level, the contact points of the physical button are not in contact with the touch screen and not a generating a signal with the touch screen. In FIG. 15B, the physical button is at a depressed level (i.e., the player is pushing the button). At the depressed level, the contact points of the physical button are in contact with the touch screen and are generating a signal with the touch screen. Support member 1504 is made from silicone rubber, in some embodiments. Support member 1504 may also seal the area around the physical button such that contaminants, including liquids, cannot come into contact with the touch screen portion that the physical button overlays.

Although the foregoing invention has been described in some detail for purposes of clarity of understanding, it will be apparent that certain changes and modifications may be practiced within the scope of the appended claims.

What is claimed is:

1. A gaming machine configured for playing one or more wager-based games of chance, comprising:

a controller configured to output one or more games of chance;

a main display configured to display the one or more games of chance;

a value input device configured to accept an indication of a wager for playing the one or more games of chance; and a hybrid touch screen display including:

a display, a touch screen overlaying at least a portion of the display, an electroactive polymer, and at least one physical button overlaying at least a portion of the display, the electroactive polymer situated between the at least one physical button and the display, the at least one physical button having a depressed level in which the at least one physical button activates the electroactive polymer and having a raised level in which the at least one physical button does not activate the electroactive polymer, the electroactive polymer being configured to vibrate at different frequencies to control the tactile feel of the at least one physical button in response to an event occurring during play of the game of chance, the event being independent of the depressed level, the hybrid touch screen display configured to:

a) display one or more input selections for playing a game of chance using the display, at least one of the input selections visible on or through the at least one physical button, b) receive game input corresponding to the at least one input selection visible on or through the at least one physical button so as to cause the electroactive polymer to be deformed, activated, and to produce a signal, and c) transmit the signal corresponding to the received game input to the controller.

2. The gaming machine of claim 1, wherein game input corresponding to the one or more input selections other than the at least one input selection visible on or through the at least one physical button is received from the touch screen.

3. The gaming machine of claim 1, the hybrid touch screen display further including:

a polymer controller, wherein the electroactive polymer is configured to vibrate at different frequencies to control the tactile feel of the at least one physical button in response to input from the polymer controller.

4. The gaming machine of claim 1, the hybrid touch screen display further including:

a polymer controller, wherein the electroactive polymer is alterable, in response to input from the polymer controller, to change the tactile feel of the at least one physical button when it is transitioning from the raised level to the depressed level.

5. A gaming machine configured for playing one or more wager-based games of chance, comprising:

a controller configured to output one or more games of chance;

a main display configured to display the one or more games of chance;

a value input device configured to accept an indication of a wager for playing the one or more games of chance;

an auxiliary display configured to display at least one input selection for playing a game of chance; and a button panel adjacent to the auxiliary display, the button panel including:

at least one physical button corresponding to the at least one input selection, the at least one physical button having a top surface with which a player may interact and a bottom surface, an electroactive polymer associated with the bottom surface of the at least one physical button, the at least one physical button further having a depressed level in which the at least one physical button activates the electroactive polymer and a raised level in which the at least one physical button does not activate the electroactive polymer, the electroactive polymer being configured to vibrate at different frequencies to control the tactile feel of the at least one physical button in response to an event occurring during play of the game of chance, the event being independent of the depressed level, the button panel configured to:

a) receive game input corresponding to the at least one input selection corresponding to the at least one physical button so as to cause the electroactive polymer to be deformed, activated, and to produce a signal, b) transmit the signal corresponding to the received game input to the controller.

6. The gaming machine of claim 5, the button panel further including:

a polymer controller, wherein the electroactive polymer is configured to vibrate at different frequencies to control the tactile feel of the at least one physical button in response to input from the polymer controller.

7. The gaming machine of claim 5, the button panel further including:

a polymer controller, wherein the electroactive polymer is alterable, in response to input from the polymer controller, to change the tactile feel of the at least one physical button when it is transitioning from the raised level to the depressed level.

* * * * *